United States Patent [19]
Harris

[11] Patent Number: 5,996,402
[45] Date of Patent: Dec. 7, 1999

[54] FUEL CAP LEAKAGE TESTER

[75] Inventor: Robert S. Harris, Connersville, Ind.

[73] Assignee: Stant Manufacturing Inc., Connersville, Ind.

[21] Appl. No.: 09/029,004

[22] PCT Filed: Aug. 16, 1996

[86] PCT No.: PCT/US96/13415

§ 371 Date: Feb. 16, 1998

§ 102(e) Date: Feb. 16, 1998

[87] PCT Pub. No.: WO97/08528

PCT Pub. Date: Mar. 6, 1997

Related U.S. Application Data

[60] Provisional application No. 60/002,456, Aug. 16, 1995.

[51] Int. Cl.⁶ ........................................... G01M 3/32
[52] U.S. Cl. .................................. 73/49.7; 73/40
[58] Field of Search ............................. 73/40, 49.7, 49.8

[56] References Cited

U.S. PATENT DOCUMENTS

| | | |
|---|---|---|
| 2,847,851 | 8/1958 | Enell . |
| 2,940,301 | 6/1960 | Hughes et al. . |
| 2,940,303 | 6/1960 | Enell . |
| 3,014,361 | 12/1961 | Black . |
| 3,022,658 | 2/1962 | Black . |
| 3,138,949 | 6/1964 | Pipes . |
| 3,807,219 | 4/1974 | Wallskog ................................... 73/40 |
| 4,071,838 | 1/1978 | Block . |
| 4,235,100 | 11/1980 | Branchini . |
| 4,494,402 | 1/1985 | Carney . |
| 4,497,290 | 2/1985 | Harris ................................. 123/179.11 |
| 4,584,885 | 4/1986 | Cadwell . |
| 4,597,003 | 6/1986 | Aine et al. . |
| 4,600,934 | 7/1986 | Aine et al. . |
| 4,783,237 | 11/1988 | Aine et al. . |
| 4,794,790 | 1/1989 | Metaxa et al. . |
| 4,996,627 | 2/1991 | Zias et al. . |
| 5,019,783 | 5/1991 | Cadwell . |
| 5,028,876 | 7/1991 | Cadwell . |
| 5,048,165 | 9/1991 | Cadwell . |
| 5,049,421 | 9/1991 | Kosh . |
| 5,146,902 | 9/1992 | Cook et al. . |
| 5,158,054 | 10/1992 | Otsuka . |
| 5,323,640 | 6/1994 | Porcaro et al. .......................... 73/49.7 |

FOREIGN PATENT DOCUMENTS

| | | |
|---|---|---|
| 2 635 823 | 8/1988 | France . |
| 4-131729 | 5/1992 | Japan ......................................... 73/40 |

*Primary Examiner*—Daniel S. Larkin
*Attorney, Agent, or Firm*—Barnes & Thornburg

[57] ABSTRACT

A fuel cap leakage tester including a first and a second passage having equal restrictions connected to an inlet which receives a source of pressure. A restriction is placed at the outlet of first passage and the cap to be tested is placed at the outlet of the second passage. An indicator is connected to the first passage between the inlet restriction and outlet restriction and to the second passage between the inlet restriction and the outlet for indicating if the leakage at the outlet with the cap therein is greater or less than the flow rate of the other outlet restriction. The other outlet restriction is set to a desired standard.

65 Claims, 15 Drawing Sheets

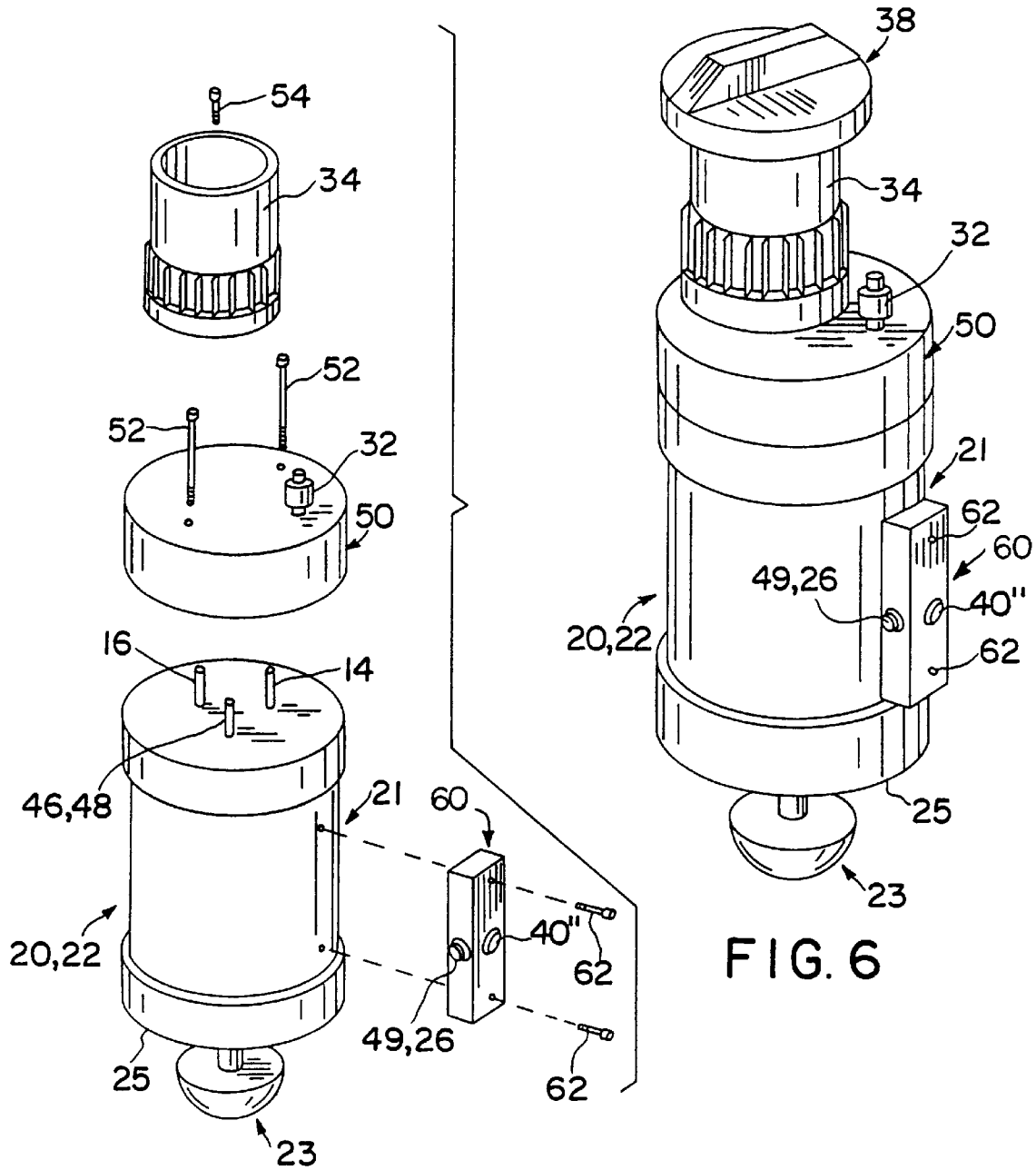

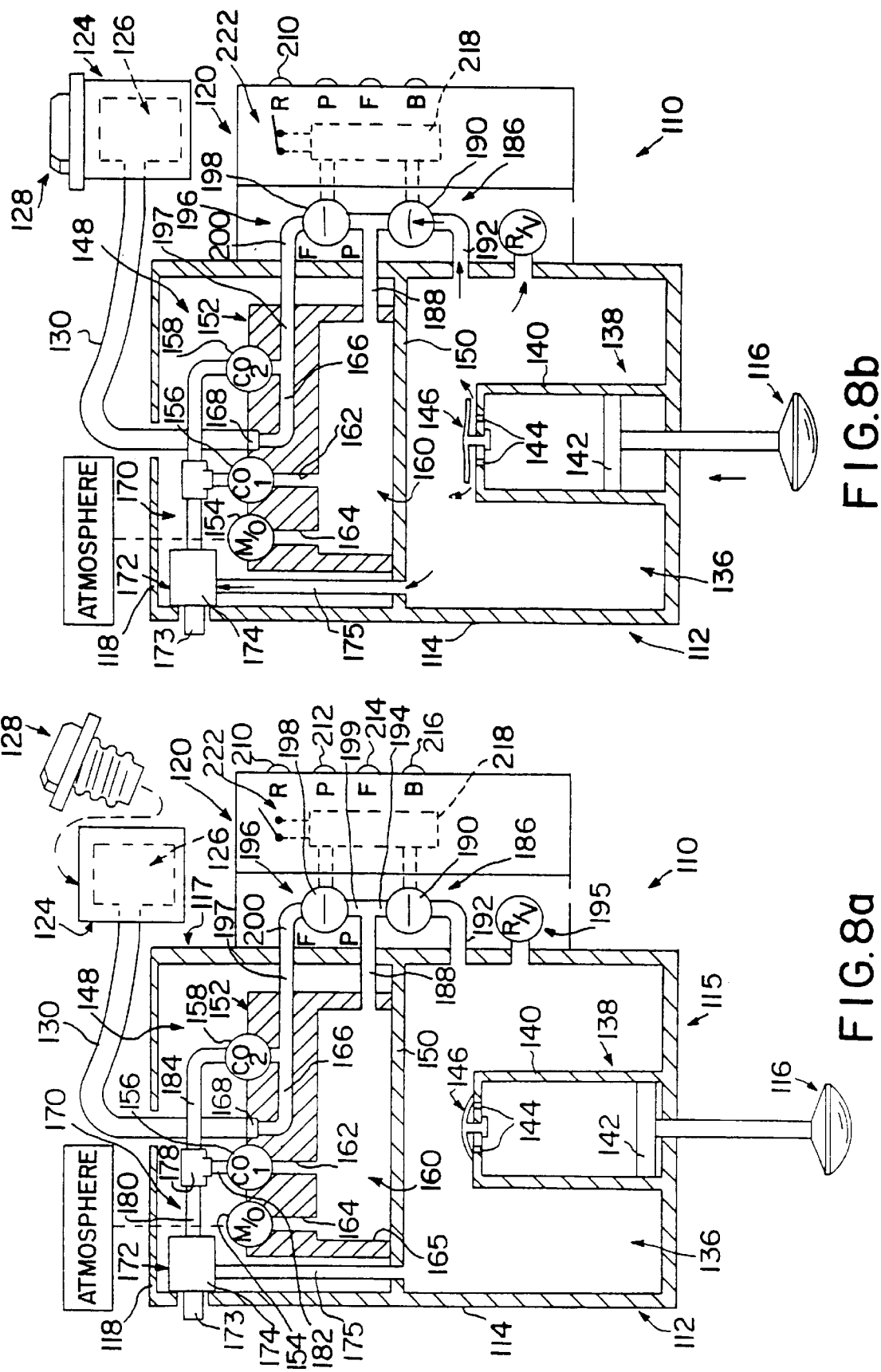

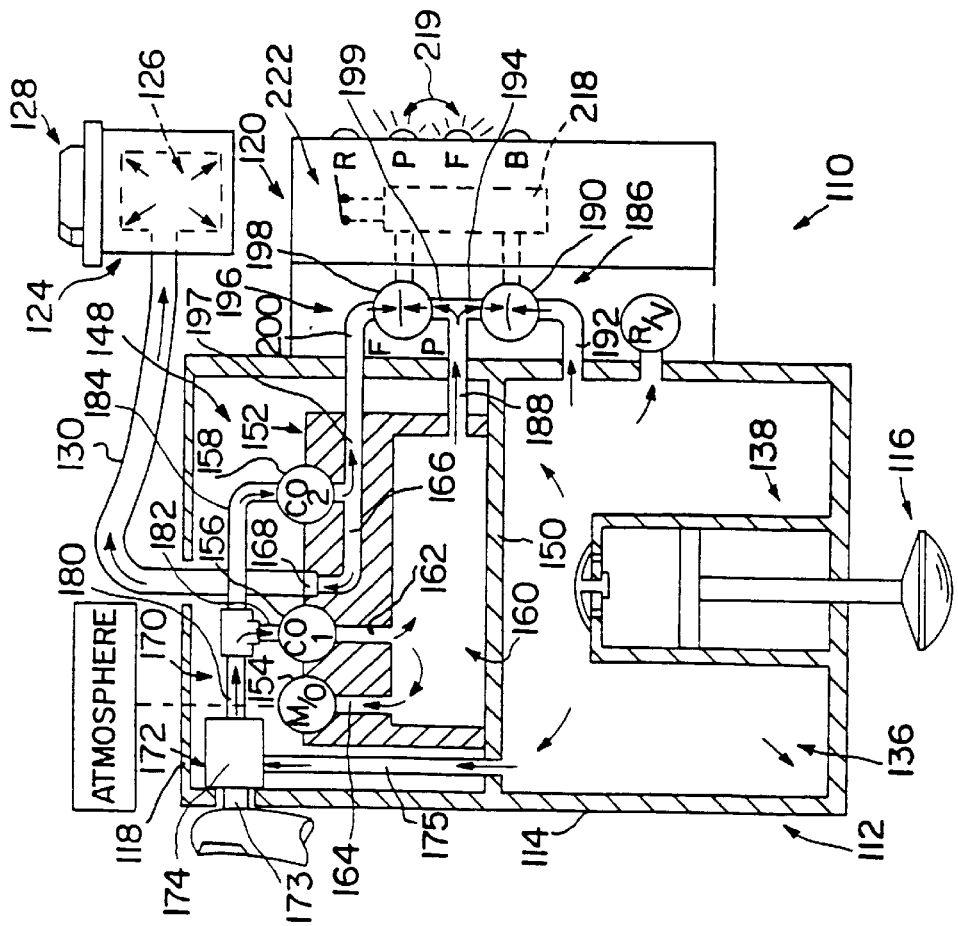
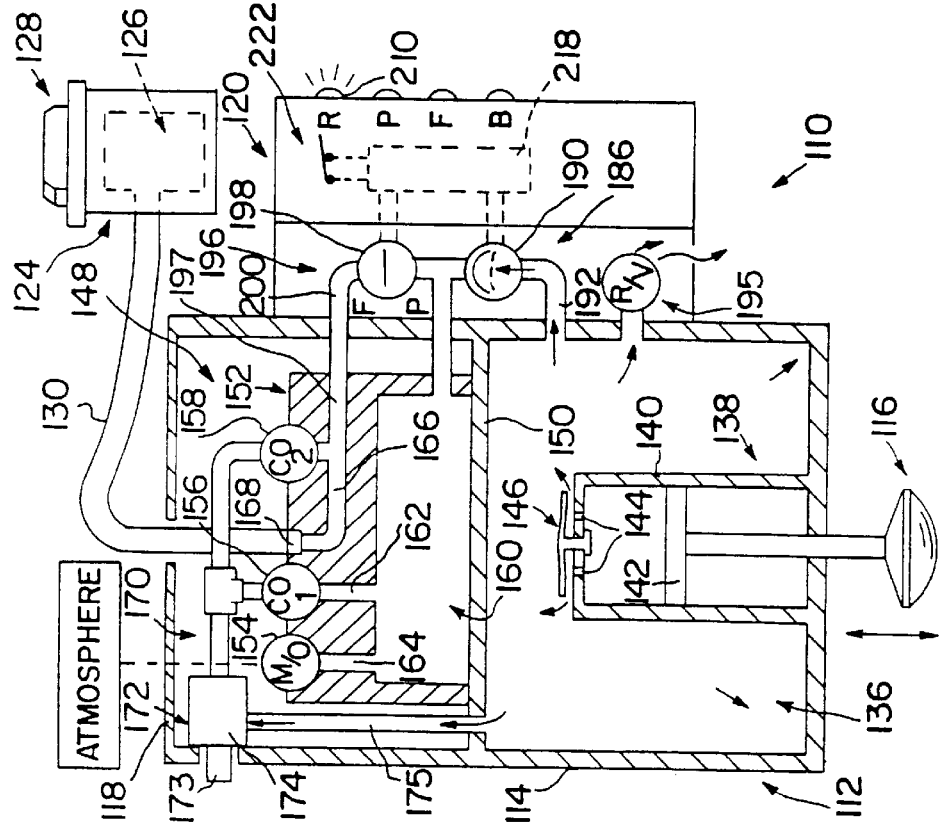
FIG.8d
FIG.8c

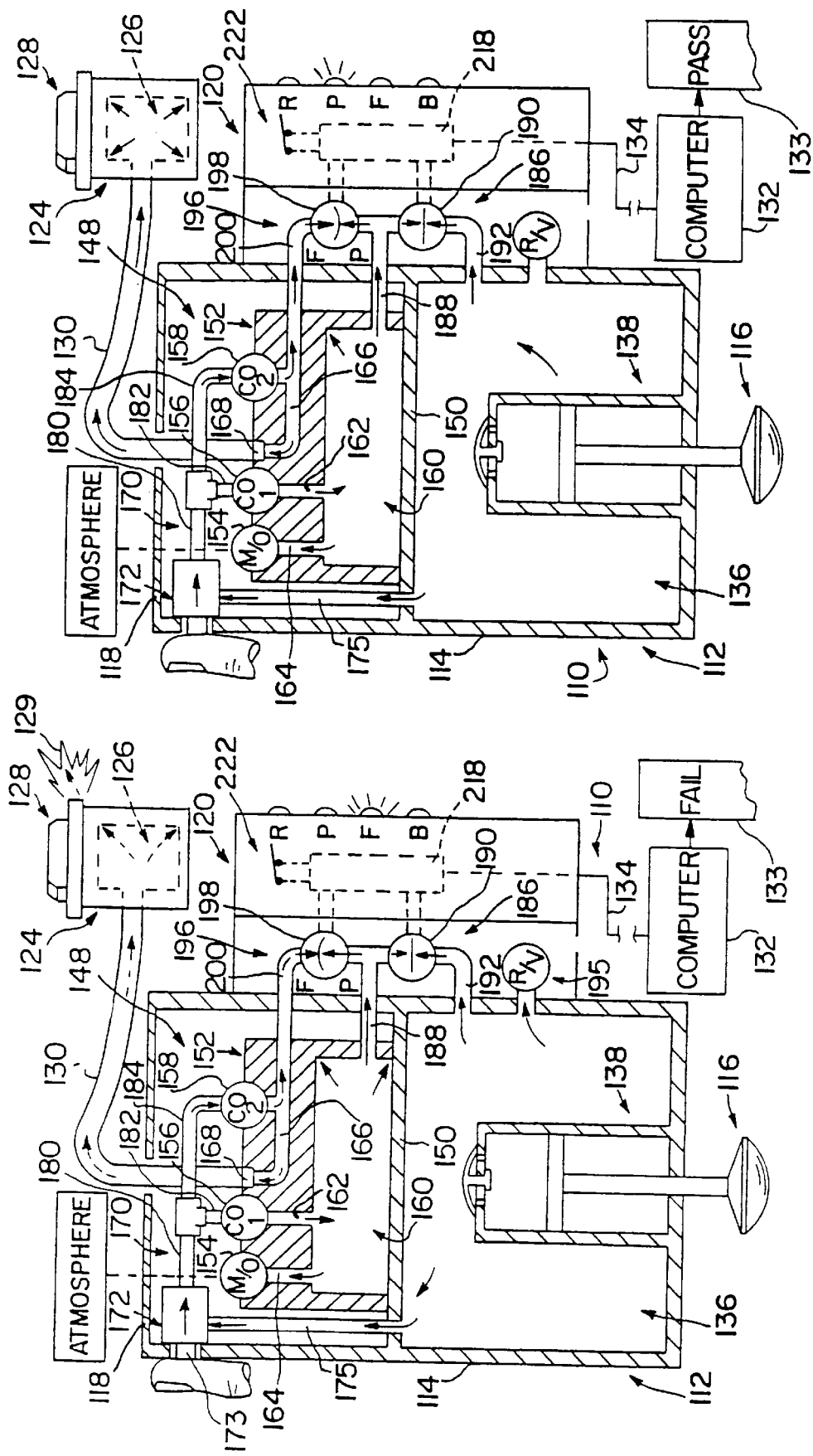

FUEL CAP LEAKAGE TESTER

CROSS-REFERENCE TO RELATED APPLICATIONS

This application is a U.S. National application of international application serial No. PCT/US96/13415 filed Aug. 16, 1996, which claims priority to U.S. Ser. No. 60/002,456 filed Aug. 16, 1995.

BACKGROUND AND SUMMARY OF THE INVENTION

The present invention relates generally to fuel caps and particularly to a system for field testing the leakage level of fuel caps more particularly, the present invention relates to a portable fuel cap leakage tester for enabling a technician to determine if a fuel cap for providing a sealed closure on a vehicle fuel tank filler neck leaks at a rate that is equal to or less than a specified maximum acceptable fuel cap leak rate.

In-Use Maintenance (I/M) regulations enforced in many states require the inspection, diagnosis, and repair of a fuel system, liquid and vapor leaks as part of the yearly vehicle testing. More specifically, the testing requirement is included in the I/M240 regulation. Typically, to conduct these tests, testers have pressurized the system to be tested and timed the rate of pressure decay to determine passage or failure. This method has variable accuracy depending on the atmosphere pressure and other variables and can take considerable lengths of time if the leak is very small. An example of a prior art system which was capable of performing a system leakage test is described in U.S. Pat. No. 4,497,290 to Robert S. Harris and assigned to Stant Manufacturing Inc. Apparatus for automated testing of vehicle fuel caps is disclosed in U.S. Pat. No. 5,323,640 to Porcaro et al.

The simplest and most inexpensive portion of the system which can be replaced if it is the source of the leak is the fuel cap. The system test does not isolate the source of the leak and generally does not include the fuel cap since the tester is connected to the filler neck where the fuel cap is inserted. Thus, there exists a need for testing the fuel cap independent of the system to determine whether it meets the required standards and specifications.

According to the present invention, a first and a second passage having equal restrictions connected to an inlet which receives a source of pressurized fluid such as air is provided. A restriction is placed at the outlet of first passage and the cap to be tested is placed at the outlet of the second passage. The restriction at the outlet of the first passage is set to a desired leak rate standard. Because of these equal flow restrictions in the first and second passages, as the flow rate of air in one of those passages increases the pressure of air in that one passage decreases and thus the flow rate in a passage is inversely proportional to the pressure in that passage.

An indicator is connected to the first passage between the inlet and outlet restrictions and to the second passage between the inlet restriction and the outlet for indicating if the leakage at the outlet receiving the cap therein is greater or lesser than the flow rate of the restriction that is placed at the outlet of the first passage. If the cap to be tested leaks at an unacceptably high rate and thus fails the test, the indicator will show that the flow rate of pressurized air in the standardized first passage is lesser than the flow rate of pressurized air in the cap-receiving second passage. If the cap to be tested is characterized by zero leak or an acceptably low leak and thus passes the test, the indictor will show that the flow rate of pressurized air in the standardized first passage is greater than the flow rate of air in the cap-receiving second passage.

The indicator may be a U-shaped manometer having a leg connected to the first passage and another leg coupled one to the second passage. Alternatively, the indicator may be a pneumatic differential pressure gauge or an electrical differential pressure gauge. An inlet valve is provided to connect and disconnect the source of pressure to the first and second passages for initiating and terminating a test. If an electrical differential pressure gauge is used, a switch for activating and deactivating the pressure gauge is simultaneously operated with the operation of the valve for initiating and terminating the test. The indicator can quantitatively or qualitatively indicate the results of the test. The source of pressure includes a reservoir charged by a pump which may be a manually-operated or battery-operated pump.

In preferred embodiments, the fuel cap leakage tester is designed to be operated by a technician conducting an inspection to determine if the leakage of a designated test fuel cap is equal to or less than a specified leak rate and acceptable or if greater than the maximum specified, a failure which must be repaired or replaced. This specification describes a tester, which measures air pressure to detect actual leakage flow rate of the test cap and compares it to the flow rate of a designated master orifice on each test.

The tester is self-contained and capable of providing a positive pass-fail indication without any external input requirement. The tester provides a visual indications of test status with colored L.E.D. signals. Signals provided include READY-TO-TEST; PASS; FAIL; AND LOW BATTERY. The tester is designed to complete testing sequence to positive Pass/Fail indication in fifteen (15) seconds maximum duration after the technician signals cap installation by pressing a test button mounted on the tester.

The tester is portable and low-weight. A loop-type shoulder strap is provided for carrying the tester. All elements of the tester which affect calibration (i.e. Master Orifice) are concealed to minimize tampering. Cover plates and housings which allow access to tester operating components are attached with tamper-resistant fasteners requiring special tools (which are not readily available) for removal.

The tester is equipped with a hand-operated pump capable of pressurizing an air reservoir. The pump is equipped with one-way outlet check valve which retains pressure in the air reservoir to minimum test levels for a period of one (1) minute with the tester at rest after fully charging the air reservoir. The tester is provided with an overpressure regulator which controls maximum reservoir pressure to the specified level.

A Pass/Fail characteristic of each cap to be tested is determined by using the tester to make a flow comparison of the test cap to a master orifice which has a rated flow at a specified test pressure. The tester is provided with an operator-controlled test actuator switch which supplies test air from the air reservoir to a pneumatic circuit. The test actuator switch is normally off and requires the technician to activate switch for test duration.

The tester will detect reservoir pressure and flash a READY-TO-TEST indicator when air reservoir pressure is within test parameters. Pressure detectors on board the tester are activated automatically each time the tester is picked up by a technician in response to operation of a motion-activated on/off switch on board the tester. When the technician presses the test actuator switch button, the tester will monitor pneumatic circuit pressure and make a Pass/Fail leakage (flow) comparison when the Master Orifice is at the designated test pressure and flash either a FAIL or PASS indicator. The PASS or FAIL indicator shall remain on for ten (10) seconds. If a test is initiated, but pneumatic circuit pressure is not correct, the tester circuit will continue to monitor until eighteen (18) seconds has elapsed, then cycle both PASS and FAIL lights for two (2) seconds and then return to the Not Ready to Test state.

Additional objects, features, and advantages, of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is an exploded view of an embodiment of a fuel cap leakage tester using a modified schematic of FIG. 4;

FIG. 6 is a view of the fuel cap leakage tester of FIG. 5 following assembly and insertion of a cap to be tested into a fuel cap adapter included in the fuel cap leakage tester;

FIGS. 8a–f show schematic diagrams of air flow in the fuel cap leakage tester during various stages of operation of the tester;

FIG. 8a is a schematic diagram showing the tester at an initial stage prior to (1) installation of a cap to be tested in the cap base, (2) use of the pump to pressurize air in a large reservoir chamber formed in the tester housing around the pump to generate a supply of pressurized air for use in a cap testing sequence, and (3) actuation of motion-activated tester on/off switch located in the electronics module mounted on the tester housing;

FIG. 8b is a diagram similar to FIG. 8a showing installation of the cap to be tested in the cap base, closure of the motion-activated tester on/off switch to actuate the fuel cap leakage tester, and operation of the pump to pressurize the reservoir chamber in the tester housing to an elevated pressure that is less than the minimum pressure that must be reached before the test may begin;

FIG. 8c is a diagram similar to FIGS. 8a and b, showing further operation of the pump to elevate the air pressure in the reservoir chamber to a specified minimum ready-to-test pressure required to carry out the leakage test on the cap to be tested, illumination of ready-to-test signal light "R" on the electronics module in response to a signal from a reservoir pressure detector including a differential pressure transducer signifying that the ready-to-test pressure in the reservoir chamber has been reached, and venting of excess pressure from the reservoir chamber through a pressure-relief valve "R/V" to the atmosphere to maintain an acceptable pressure level in the reservoir chamber;

FIG. 8d is a diagram similar to FIGS. 8a–c showing manual actuation of a push button included in the test actuator switch to open a normally closed flow control valve also included in the switch to cause pressurized air to flow form the reservoir chamber through (1) a first control orifice "CO1", a first passage, and then a calibrated master orifice "MO" to reach the atmosphere and (2) a second control orifice "CO2" (equal in diameter to the first control orifice) and then a second passage to reach the cap base and showing alternating illumination (i.e. strobing) of passing signal light "P" and failing signal light "F" on the electronics module signifying that the volumes of pressurized air in the first passage interconnecting the first control orifice and the master orifice and the second passage interconnecting the second control orifice and the cap base have not yet reached an equilibrium state which must be reached before the cap can be tested;

FIG. 8e is a diagram similar to FIGS. 8a–d showing illumination of failing signal light "F" on the electronics module in response to a signal from a fuel cap leakage detector "F/P" including another differential pressure transducer that the air pressure in the second passage (between the second control orifice and the cap base) is lesser than the air pressure in the first passage (between the first control orifice and the master orifice)—and thus the flow rate of pressurized air leaking from the cap base past the cap to be tested is greater than the flow rate of pressurized air through the master orifice (which is calibrated at the specification limit for acceptable leakage) signifying that the fuel cap installed in the cap base has failed the fuel cap leakage test;

FIG. 8f is a diagram similar to FIGS. 8a–e showing illumination of the passing signal light "P" on the electronics module in response to a signal from the fuel cap leakage detector "F/P" that the air pressure in the second passage (between the second control orifice and the cap base) is greater than the air pressure in the first passage (between the first control orifice and the master orifice)—and thus the flow rate of the pressurized air leaking from the cap base (if any) is lesser than the flow rate of pressurized air through the master orifice (which is calibrated at the specification limit for acceptable leakage) signifying that the fuel cap installed in the cap base has passed the fuel cap leakage test;

DETAILED DESCRIPTION OF THE DRAWINGS

Figure 1:
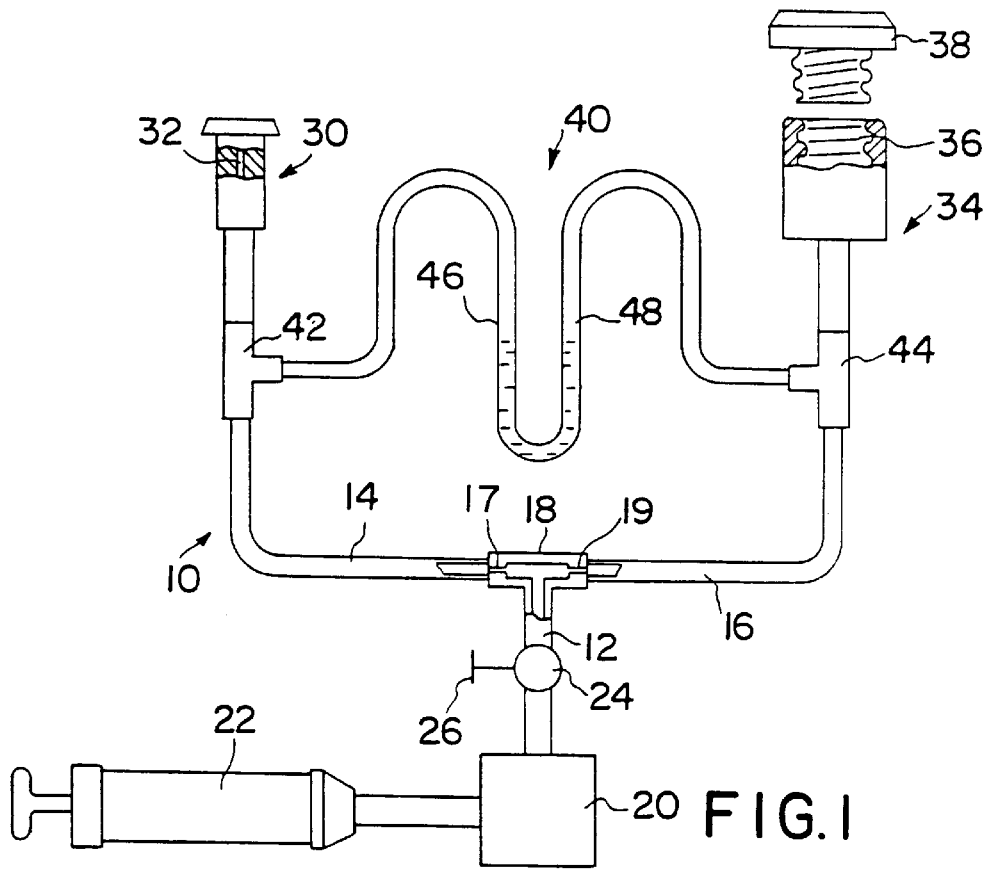
FIG. 1 is a diagram of a fuel cap leakage tester using a manometer indicator incorporating the principles of the present invention.

A fuel cap leakage tester 10 is illustrated in FIG. 1 as including an inlet passage 12 connected to first and second passages 14 and 16 by a T-connector 18 including equal restrictions 17 and 19. A source of pressure, indicated as a reservoir 20 pressurized by a pump 22, is connected to the inlet passage 12. A valve 24 with operator 26 connects and disconnects the reservoir 20 from the T-connector 18 to activate and deactivate the tester 10. Connected to the outlet 30 is a "master" or "standardized" restriction 32 which is calibrated at the specification limit for acceptable leakage. The master restriction 32 may be removably attached and sealed at the outlet 30 such that it can be changed for changes of the specification limits for acceptable cap leakage. At outlet 34 of passage 16 is provided a threaded section 36 equivalent to the filler neck threading of a fuel tank. A fuel cap to be tested 38 is shown adjacent the threaded inlet 36.

An indicator system 40, which is illustrated as a U-shaped manometer, is connected at T-connectors 42 and 44 to the first passage 14 and the second passage 16. The manometer includes a pair of legs 46 and 48 connected to the T-connectors 42 and 44 respectively. The level of fluid in legs 46 and 48 are shown equal in FIG. 1 when cap leakage tests are not being performed and is shown not equal in FIGS. 2 and 3 for a failed test and a passed test respectively. Before a cap leakage test is to be conducted, the reservoir 20 is pressurized by a pump 22. Pump 22 is illustrated as a hand pump to make this system easily portable. It may also be a portable electric pump connected to an outlet or to a cigarette lighter or other sources of DC. The valve 24 on the inlet passage 12 is closed to maintain the reservoir 20 fully charged. The cap 38 to be tested is then threadably received in the threadable outlet 36. Before the initiation of the cap leakage test, the fluid in legs 46 and 48 of the indicator 40 are of equal height as illustrated in FIG. 1.

To initiate the cap leakage test, valve 24 is opened using operator 26, allowing the pressurized fluid in reservoir 20 to flow into passages 14 and 16 through equal restrictions 17 and 19. The fluid in first passage 14 is vented to atmosphere through the master restriction 32 at a fixed flow rate that is set to match the maximum acceptable leakage rate of a fuel cap to be tested. The fluid in passage 16 for a failing fuel cap 38 will leak around the threaded connection 36 at a greater rate than at master restriction 32. The fluid in passage 16 for a passing fuel cap 38 will leak around the threaded connection 36 at a lesser rate than at master restriction 32. The restrictions 17 and 19 causes pressure in the passages 14 and 16 to be at a lower pressure when leaks occur through master restriction 32 and through the gas cap 38.

Figure 2:
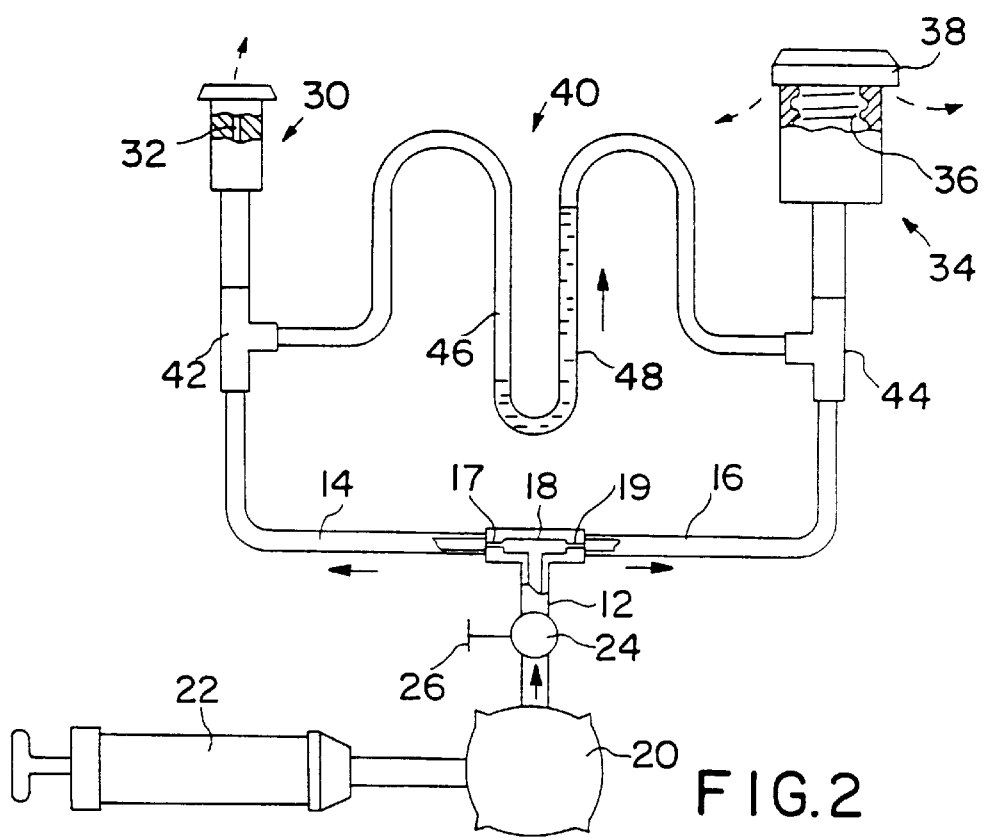
FIG. 2 is a diagram similar to FIG. 1 showing the liquid level in the manometer of FIG. 1 for a failed cap.

If the leakage at the gas cap 38 has a flow rate greater than that through master restriction 32, the pressure in passage 14 will be greater than the pressure in passage 16. The manometer 40 would indicate that difference in pressure, as illustrated in FIG. 2, by the height of the liquid in leg 48 being greater than the height of the liquid in leg 46. Thus, providing an indication that the gas cap 38 has failed the cap leakage test.

Figure 3:
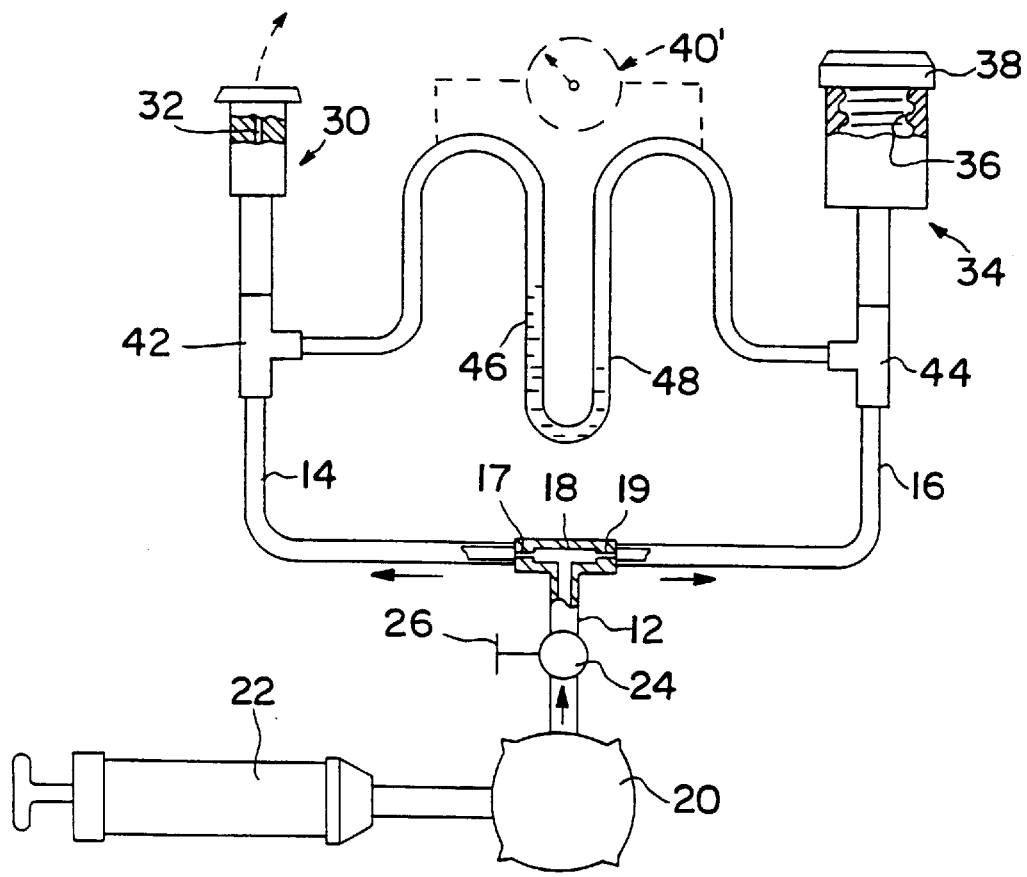
FIG. 3 is a diagram similar to FIGS. 1 and 2 showing the liquid level in the manometer of FIG. 1 for a passing cap.

If the flow for this specific pressure is only through master restriction 32 (i.e., there is no leakage around gas cap 38), or the leakage around the gas cap 38 is less than the flow through master restriction 32, the pressure in passage 16 would be greater than the pressure in passage 14. Thus, the level of fluid in leg 46 of the manometer 40 would be higher than the level of the level fluid in passage 48, as illustrated in FIG. 3. This would indicate that the gas cap 38 has passed the cap leakage test.

Preferably, valve 24 is a manual off-on push button valve. Thus, a cap leakage test is being performed as long as manual pressure is applied to the valve operator 26 to connect the charge reservoir 20 through the inlet passage 12 to the T-connector 18. Other types of valves may be used.

As illustrated in the dotted lines in FIG. 3, the indicator 40 may be differential pressure gauge 40' having a pointer which can either indicate the value of the differential pressure or have red and green areas indicating pass and fail regions.

Figure 4:
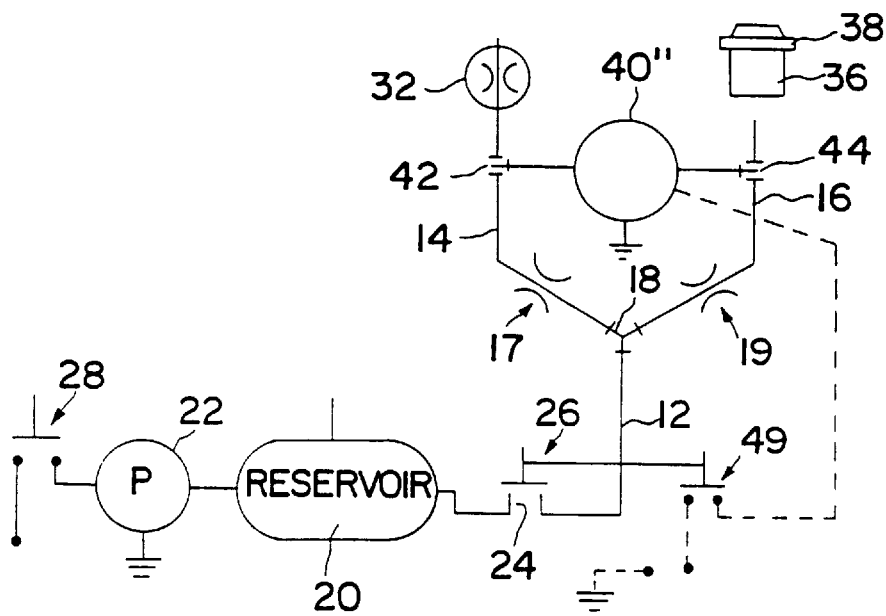
FIG. 4 is a schematic of a fuel cap leakage tester including an electric indicator incorporating the principles of the present invention.

As an even further alternative, an electrical or electronic differential pressure meter 40" may be used as illustrated in FIG. 4. An on-off switch 49 is electronically connected to the electrical indicator 40". It is ganged or connected to the operator 26 of the valve 24 connecting the reservoir 20 to the inlet tube 12. Thus, upon closing of the valve 24 to connect the source of pressure to the system to initiate the cap leakage tests also activates the electrical indicator 40". The indicator 40" may include its own battery source or may be connected to a source of electrical power, be it a battery of a vehicle or possibly a wall outlet. The electrical meter 40" may be a meter which has analog or digital output indicating a quantitative or a qualitative value. It also may include nothing more than a red or green light. The system shown in FIG. 4 also includes an on-off switch 28.

FIG. 5 shows an implementation of the fuel cap leakage tester of FIG. 4. A single canister 21 is shown as including the air supply 20 and pump 22. A manual pump handle 23 extends from the bottom 25 thereof. Conduits for passages 14, 16 are shown extending from the air supply with pump 20, 22 and a return conduit or passage 46, 48 provides the differential air pressure signal to the air supply with pump housing 20, 22 inside canister 21. The flow restrictor 17 and 19, not shown, are in the air supply with pump housing 20, 22 inside canister 21. A pneumatic module 50 which includes the master restriction 32 mounted therein is mounted to the canister 21 containing air supply with pump 20, 22 by fasteners 52. The fuel cap adapter or outlet 34 is secured to the pneumatic module 50 by screw 54 and is configured to receive and hold a fuel cap 38 to be tested.

Electronic module 60 is secured to the canister 21 containing air supply with pump housing 20, 22 by fasteners 62.

The electronic module 60 includes the buttons 49 and 26 and includes the electronic indicator 40". In the preferred embodiment, this is a light-emitting diode which shines either red or green, depending upon the test results. The combined button 49, 26 activate the electronics for the testing and manually operates a valve to provide the pressurized air to the conduits 14 and 16. Alternatively, the button 26 may be merely an electrical button and the test is performed by merely activating the pump until a sufficient supply is provided.

The electronics module 60 is connected by wires, not shown, to the differential conduits 46, 48 in the air supply with pump 20, 22 and the pneumatic module 50 only includes the pneumatic connections to passages 14 and 16, 46 and 48.

The various indicators 40 shown are merely examples of these that can be used to measure the differential pressure in the passages 14 and 16 to provide an indication either quantitatively or qualitatively of whether the cap 38 to be tested has passed or failed a test as measured against a standard flow rate at master restriction 32.

Figure 7:
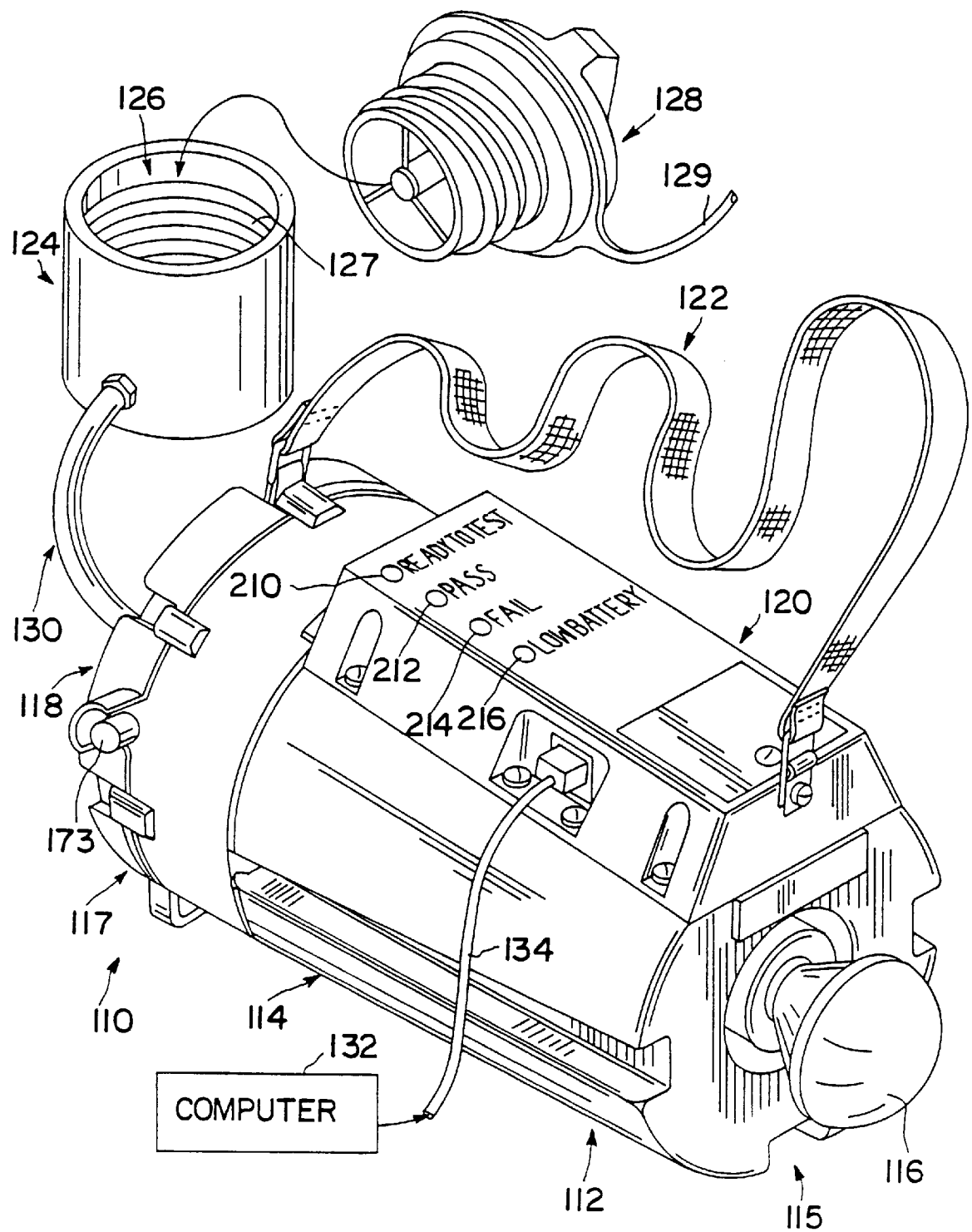
FIG. 7 is a perspective view of a fuel cap leakage tester in accordance with a presently preferred embodiment of the present invention showing a cap to be tested and a fuel cap leakage tester including a cap base for receiving the cap to be tested, a tester unit including a tester housing, a pump handle mounted at one end of the tester housing, a push button for a test actuator switch mounted at an opposite base end of the tester housing, an electronics module on the tester housing including ready-to-test, pass, fail, and low battery signal lights, a shoulder strap coupled to the tester housing, and a pressurized air supply hose extending between the base end of the tester housing and the cap base.

A presently preferred embodiment of a fuel cap leakage test system 110 is shown in FIG. 7. System 110 includes a test unit 112 including a housing 114 having a right-side end 115 carrying a pump handle 116 and a left-side end 117 carrying an end cover 118, and an electronics module 120 mounted on housing 114. A shoulder strap 122 has one end coupled to housing 114 and another end coupled to electronics module 120 and is provided to enhance the portability of test unit 112.

System 110 further includes a base 124 formed to include a base chamber 126 and configured to resemble the outer end of a fuel tank filler neck (not shown) and receive a fuel cap to be tested 128 in base chamber 126. Base 124 also includes internal threads 127 for receiving a fuel cap 128 to be tested or a threaded adaptor (not shown) configured to support fuel cap 128 in base chamber 126. It is within the scope of present invention to provide a set of adapters, each of which has one end for threadably engaging threads 127 in base chamber 126 and another end for receiving a particular style of fuel cap so that virtually any fuel cap 128 can be mounted in one cap base 124 by mounting the cap 128 to be tested in its companion adapter and then installing the cap-carrying adapter in base chamber 126 of cap base 124. System 110 also includes a pressurized air supply hose 130 for conducting pressurized air from housing 114 to base chamber 126 to enable an inspector to apply pressurized air to the cap 128 to be tested during a fuel cap leakage test conducted using test system 110.

Many fuel caps 128 are coupled to vehicles by tethers such as tether 129 shown in FIG. 7. Test unit 112 is portable to enable inspectors to test tethered fuel caps 128 without having to first disengage cap 128 from its tether 129. In the embodiment of FIGS. 5 and 6, the cap base 34 is mounted in a fixed position on housing 20, 22, 50. In the embodiment of FIGS. 7–10, the cap base 124 is movable relative to housing 114 and is connected to housing 114 by a flexible pressurized air supply hose 130.

Electronic module 120 is coupled to a remote host computer 132 by communication line 134 and network (not shown) to enable supervising officials resident at one or more central locations to monitor the test results of each cap tested using fuel cap leakage tester system 110 throughout the geographic region monitored by those officials. During an official state vehicle inspection conducted using system 110, an inspector would enter the vehicle identification number of a vehicle carrying a cap to be tested and then test the cap carried by that vehicle using system 110 to determine whether that cap passed or failed the fuel cap leakage test established by system 110. The results of such test would then be communicated from electronics module 120 to host computer 132 over communication line 134 for storage and observation.

A schematic diagram of fuel cap leakage test system 110 showing the state of system 110 prior to initiation of a test procedure is shown in FIG. 8a. Other diagrams showing various stages of operation of system 110 are illustrated in FIGS. 8b–f.

Housing 114 includes a reservoir chamber 136 for containing a supply of pressurized air and a pump 138 for pressurizing air in reservoir chamber 136 as shown in FIG. 8a. Pump 138 includes a cylinder 140 positioned to lie in reservoir chamber 136 and fixed to right-side end 115 of housing 114, a piston 142 movable in cylinder 140 and coupled to pump handle 116, air flow apertures 144 formed in cylinder 140 through apertures 144, and a one-way check valve 146 for allowing one-way air flow out of cylinder 140 into reservoir chamber 136.

Housing 114 also includes a metering chamber 148 positioned to lie between reservoir chamber 136 and end cover 118 and to receive one end of pressurized air supply hose 130. A partition member 150 is mounted in an interior region of housing 114 to divide the interior region into a first cavity defining reservoir chamber 136 and a second cavity defining metering chamber 148.

Figure 9:
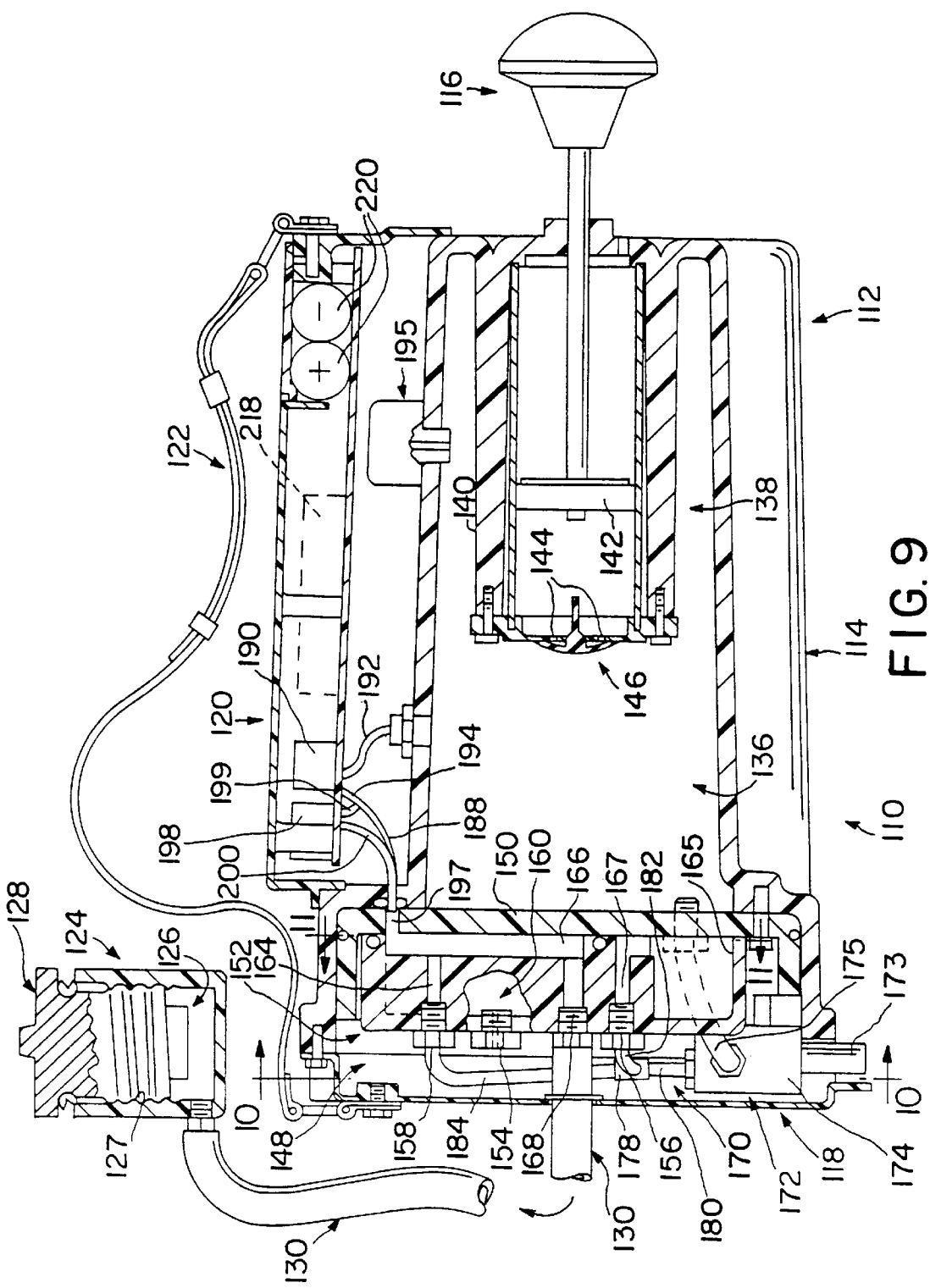
FIG. 9 is longitudinal sectional view of the cap base and tester housing of FIG. 1 taken along line 9—9 of FIG. 10 showing a tester housing having an interior region, an end cover attached to a left-side end of the tester housing, an end cap mounted in the tester housing to partition the interior region to define a reservoir chamber extending to the right-side end of the tester housing, and a metering chamber extending to the left-side end of the tester housing, the reservoir chamber containing a portion of a pump, the metering chamber containing the actuator test switch, a meter block, and various hoses and conduits and showing the electronics module engaging the tester housing and containing a circuit board, a circuit, batteries, a cap leakage detector, a reservoir pressure detector, various wires, and a pressure-relief valve for the reservoir chamber.
Figure 10:
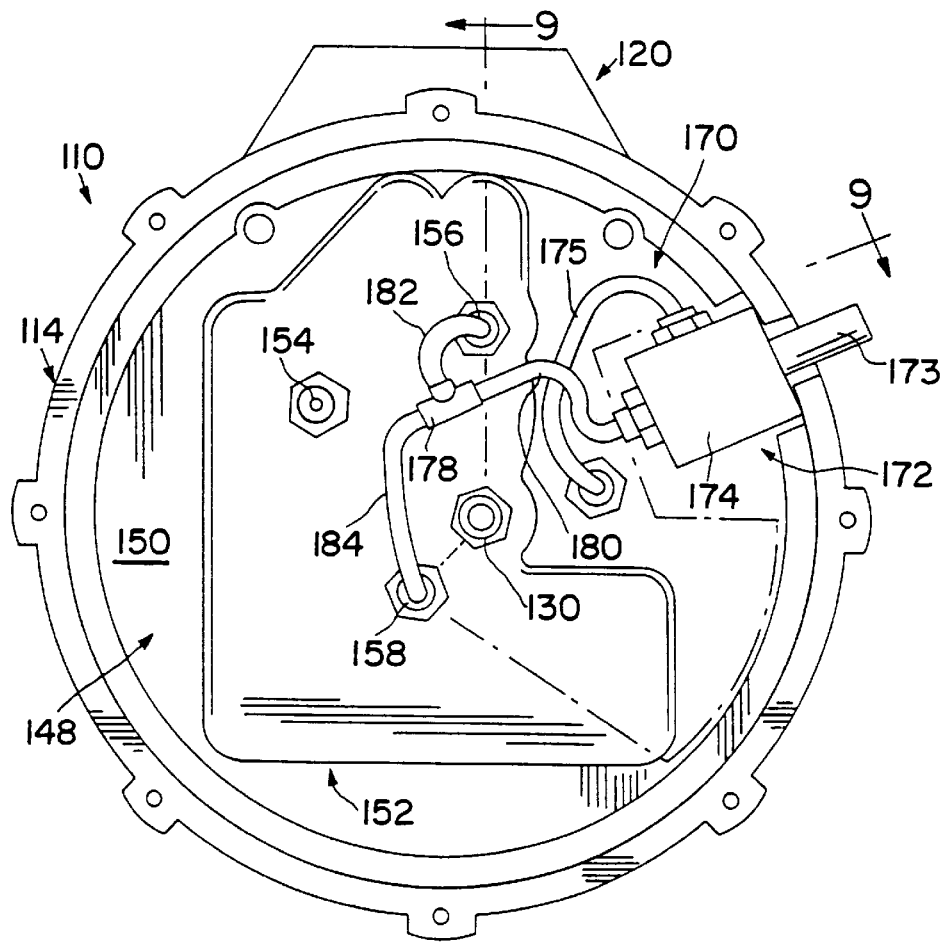
FIG. 10 is a transverse sectional view taken along line 10—10 of FIG. 9 showing the meter block and test actuator switch situated in the metering chamber, the master, first control, and second control orifices formed in a top wall of the meter block, and various pressurized air conduits coupled to the test actuator switch and to the first and second control orifices.
Figure 11:
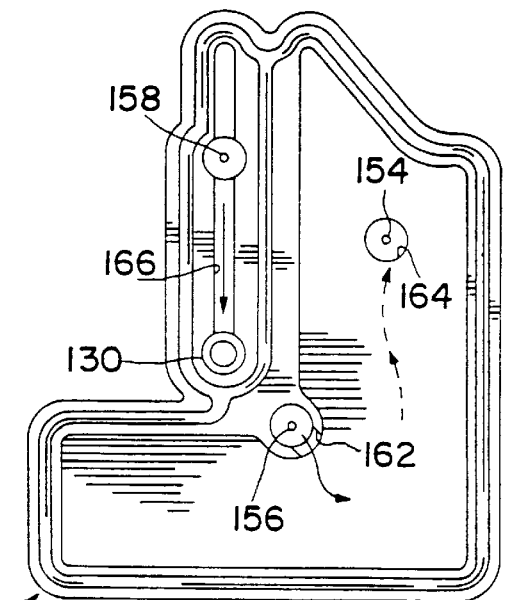
FIG. 11 a view of the meter block taken along line 11—11 of FIG. 9 showing a damper chamber formed therein and configured to communicate with the first control orifice and the master orifice and showing a straight air supply conduit interconnecting the second control orifice and the pressurized air supply hose.
Figure 12:
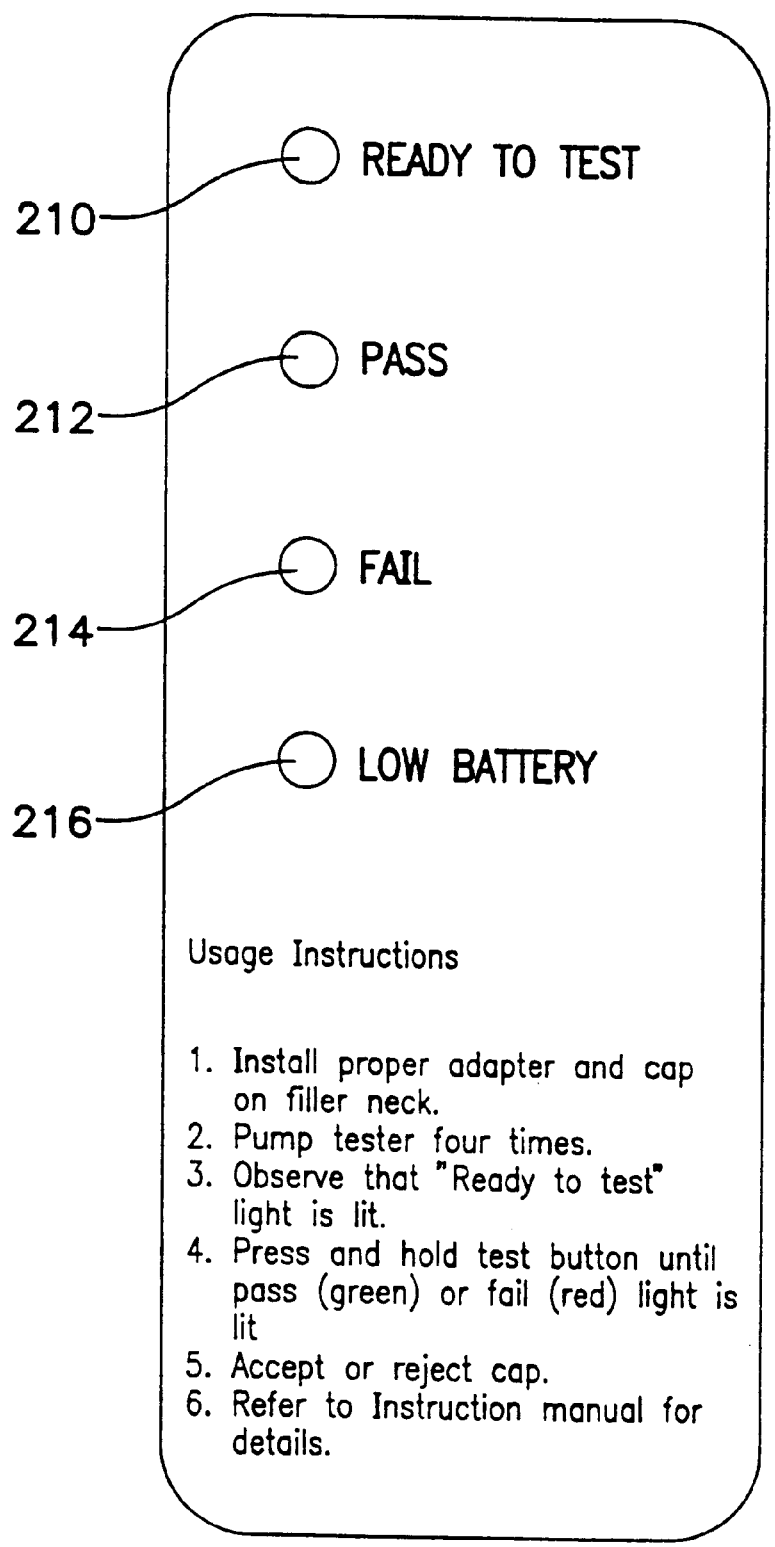
FIG. 12 is a label attached to the electronics module identifying the signal lights included in the module and outlining instructions for operating the fuel cap leakage tester.

A metering block 152 is positioned to lie in metering chamber 148 in engagement with partition member 150 as shown diagrammatically in FIG. 8a and illustratively in FIG. 9. In a preferred embodiment, metering block 152 is formed to include a master orifice (M/O) 154 having a first specified flow rate at a specified test pressure (e.g. 60 cc/min at 30 inches of water {7.5 kPa}), a first control orifice (C01) 156 having a second specified flow rate at the specified test pressure and a second control orifice (C02) 158 having a specified flow rate at the specified test pressure that is equivalent to the first control orifice 156. Master orifice 154 corresponds to master restriction 32 in the embodiment of FIG. 1 and first and second control orifices 156, 158 correspond to restrictions 17, 19, respectively, in the embodiment of FIG. 1.

Meter block 152 is formed to include a damper chamber 160, a conduit 162 interconnecting first control orifice 156 and damper chamber 160, and a conduit 164 interconnecting damper chamber 160 and master orifice 154. Illustratively, partition member 150 engages meter block 152 to close an open mouth 165 of damper chamber 160. Conduit 162, damper chamber 160, and conduit 164 cooperate to define a first passage for conducting pressurized air from first control orifice 156 to master orifice 154 for discharge into the atmosphere (illustratively via metering chamber 148). The volume of damper chamber 160 is selected in the manner described below to balance the volume of pressurized air in the first passage 162, 160, 164 with the volume of air in a second passage between the second control orifice 158 and the base chamber 126 so that the flow rates of pressurized air passing through those two passages will reach equilibrium substantially simultaneously during a fuel cap leakage test conducted using system 110.

Meter block 152 is also formed to include an air supply conduit 166 interconnecting second control orifice 158 and a fitting 168 connected to pressurized air supply hose 130. The second passage referred to above is defined by air supply conduit 166, air supply hose, and base chamber 126. It is within the scope of the present invention to provide a first air-conducting passage interconnecting orifices 154, 156 and a separate second air-conducting passage interconnecting orifice 158 and air supply hose 130 which are formed using stand-along conduits and are not formed in a single meter block.

An air supply system 170 is provided for selectively conducting pressurized air from reservoir chamber 136 to each of first and second control orifices 156, 158. Air supply system 170 includes a test actuator switch 172 including a normally closed flow control valve 174 and a valve operator 173, a switch intake conduit 175 interconnecting reservoir chamber 136 and flow control valve 174, a flow junction 178, and a switch discharge conduit 180 interconnecting flow control valve 174 and flow junction 178. Air supply system 170 further includes a first air supply conduit 182 interconnecting flow junction 178 and first control orifice 156, and a second air supply conduit 184 interconnecting flow junction 178 and second control orifice 158. When a test system operator pushes valve operator 173 inwardly, the normally closed flow control valve 174 will be opened and pressurized air will flow from reservoir chamber 136 through first control orifice 156 into first passage 162, 160, 164 to reach master orifice 154 and simultaneously through second control orifice 158 into second passage 166, 130, 126 to reach the cap 128 to be tested.

As noted below, the cap 128 to be tested will "fail" the test if the pressure in the second passage 166, 130, 126 coupled to the cap 128 is lesser than the pressure in the first passage 162, 160, 164 open to the atmosphere at master orifice 154 because such a result means that more pressurized air is leaking past the cap 128 mounted in cap base 124 than is "leaking" (i.e. being discharged at a controlled rate) through master orifice 154—which is calibrated to discharge pressurized air at the specification limit for acceptable fuel cap leakage. Said another way, the cap 128 to be tested will fail the test if the flow rate of pressurized air in the second passage 166, 130, 126 is greater than the flow rate of pressurized air in the first passage 162, 160, 164.

In contrast, the cap 128 to be tested will "pass" the test if pressure in the second passage 166, 130, 126 coupled to cap 128 is greater than the pressure in the first passage 162, 160, 164 open to the atmosphere at master orifice 154 because such a result means that less pressurized air is leaking past the cap 128 mounted in cap base 124 than is "leaking" (i.e. being discharged at a controlled rate) through calibrated master orifice 154. Said another way, the cap 128 to be tested will pass the test if the flow rate of pressurized air in the second passage 166, 130, 126 is lesser than the flow rate of pressurized air in the first passage 162, 160, 164. It will be understood that the leakage specification limit tested by system 110 can thus be varied by changing (e.g. increasing or decreasing) the internal diameter of master orifice 154. To test for "zero" leakage past a cap 128 mounted in cap base 124 it would thus be necessary to block discharge of any pressurized air through master orifice 154.

As shown diagrammatically in FIG. 8a, a reservoir pressure detector 186 is provided for sensing the level of pressure in reservoir chamber 136. Illustratively, a "first passage" conduit 188 communicating with damper chamber 160 (and thus first passage 162, 160, 164) extends outwardly from meter block 152. Reservoir pressure detector 186 includes a commercially available differential pressure transducer 190 having two inputs and lying in electronics module 120, a transducer supply conduit 192 communicating air from reservoir chamber 136 to one input of differential pressure transducer 190, and a transducer supply conduit 194 communicating air from first passage 162, 160, 164 via first passage conduit 188 to another input of differential pressure transducer 190. In a preferred embodiment, transducer 190 is the same type of transducer used in an ASHCROFT® Model XLdp Ultra-Low Differential Pressure Transducer ASH-XL-D-050-C-0-MB2-15-B-50 available from Dresser Industries, Transducer Division of Milford, Conn.

A pressure-relief valve 195 is provided for venting excess pressure from reservoir chamber 136. Pressure-relief valve 195 is positioned in electronics module 120 and configured to receive pressurized air from reservoir chamber 136.

As also shown diagrammatically in FIG. 8a, a cap leakage detector 196 is provided for comparing the pressure level in the first passage 162, 160, 164 coupled to master orifice 154 to the pressure level in the second passage 166, 130, 126 coupled to base 126. Illustratively, a "second passage" conduit 197 lying partly in meter block 152 and communicating with air supply conduit 166 in meter block 152 extends outwardly from meter block 152. Cap leakage detector 196 includes a commercially available differential pressure transducer 198 having two inputs and lying in electronics module 120, a transducer supply conduit 199 communicating air from "first passage" conduit 188 to one input of differential pressure transducer 198, and a transducer supply conduit 200 communicating air from "second passage" conduit 197 to another input of differential pressure transducer 198. In a preferred embodiment, transducer 198 is the same type of transducer used in an ASHCROFT® Model XLdp Ultra-Low Differential Pressure Transducer ASH-L-D-050-C-0-MB2-15-B-100 available from Dresser Industries, Transducer Division of Milford, Conn.

Several operator signal lights are mounted in electronics module 120 for observation by an operator using test system 110. These lights include a ready-to-test signal light "R" 210, a passing signal light "P" 212, a failing signal light "F" 214, and a low battery signal light "B" 216. An electrical circuit 218 is provided for using signals provided by pressure level detector 186, cap leakage detector 196, and module batteries 220 (FIG. 9) to illuminate lights 210, 212, 214, and 216 at proper times during a fuel cap test cycle. Various features of transducers 190, 198 and circuit 218 are disclosed in U.S. Pat. Nos. 5,049,421 relating to Transducer Glass Bonding Technique; 4,996,627 relating to High Sensitivity Miniature Pressure Transducer; 5,019,783 and 5,028,876 relating to Precision Capacitive Transducers; 5,048,165 relating to Sensitivity Controlling Methods; 4,071,838; 4,597,003; 4,584,885; 4,600,834, and 4,783,237, which references are hereby incorporated by reference herein.

A motion-activated switch 222 is mounted in the electronic module 120 and coupled to circuit 218. This is illustratively a vibration sensitive "trembler" switch that activates whenever a test unit operator picks up test unit 112 prior to a test. Activation of this switch 222 in response to movement of test unit of 112 will activate pressure level detector 186, cap leakage detector 196, and circuit 218 so that signal lights 210, 212, 214, and 216 will operate at the proper times during a test cycle in response to signals received from reservoir pressure detector 186 and cap leakage detector 196.

Prior to an initial test cycle, test unit 112 is expected to be in the condition illustrated in FIG. 8a. In this condition, the pressure level in reservoir chamber 136 is approximately atmospheric. The pressure level in first passage 162, 160, 164 is also expected to be approximately atmospheric because first passage 162, 160, 164 is vented to the atmosphere through master orifice 154. Further, the pressure level in base chamber 126 is also expected to be atmospheric because a cap 128 to be tested has not yet been installed in base 124 and base chamber 126 is open to the atmosphere.

At this initial stage, the differential pressure transducer 190 in reservoir pressure detector 186 is shown diagrammatically to include a "flat line" symbol to signify that differential pressure transducer 190 is exposed to equal pressures at each input. As noted above the pressure inputs to differential pressure transducer 190 are equivalent because atmospheric pressure is communicated to one input via transducer supply conduit 192 and atmospheric pressure is also communicated to the other input of pressure differential transducer 190 by first passage conduit 188 and transducer supply conduit 194. Likewise, at this initial stage of a test cycle, the differential pressure transducer 198 included in cap leakage detector 196 is also exposed to equal atmospheric pressures from transducers supply conduits 199 and 200. Again, the flat lined symbol in differential pressure transducer 198 signifies that the pressures at each of the two inputs to differential pressure transducer 198 are equivalent. If a test operator would happen to pick up the test unit 212 shown in FIG. 8a, motion-activated switch 222 would close, thereby activating circuit 218, reservoir pressure detector 186, and cap leakage detector 196. At that time, those two detectors 186 and 196 would begin to function. Pressure level detector 186 would sense that the pressure in reservoir chamber 136 is equivalent to the pressure in damper chamber 160. At the same time, cap leakage detector 196 would sense that the pressure in damper chamber 160 is equivalent to the pressure in base chamber 126.

If test unit 112 is coupled to a host computer 132 by a communication line 134 and network (not shown) then the test operator will next check a computer monitor to obtain information about the cap to be tested. In some cases, it will be necessary to mount cap 128 on an adapter (not shown) prior to insertion of the cap 128 into cap base 124 to facilitate mounting of the cap 128 into cap base 124. As noted above, adapters to fit fuel caps for a wide variety of vehicles and model years will be made available to the test operator to enable the operator to mount virtually any fuel cap in a standard cap base 124. The vehicle fuel cap is then removed from the vehicle and installed on the cap base 124. It may be more convenient for some users to install the fuel cap 128 on the adaptor before installing the adaptor on cap base 124.

Referring now to FIG. 8b, the test operator will now begin to use pump 138 to increase the level of pressure of air in reservoir chamber 136. In a presently preferred embodiment, it is desired to increase the air pressure in pressure reservoir 136 to 37 inches of water. Pump handle 116 is reciprocated by the test operator to cause the pressure level in reservoir chamber 136 to increase. Air contained in cylinder 140 is discharged from cylinder 140 through air flow apertures 144 and past the deflected one-way check valve 146 to charge the reservoir chamber 136. It is expected that the test operator will need to move pump handle 116 from one to four strokes depending upon the time interval between fuel cap leakage tests.

Although reservoir chamber 136 shown in FIG. 8b has been pressurized somewhat due to use of pump 138, the ready-to-test signal light "R" 210 has not yet lit because the pressure level in reservoir chamber 136 has not yet reached its target pressure level. Pressurized air from reservoir chamber 136 is communicated to one input of the differential pressure transducer 190 in reservoir pressure detector 186 via transducer supply conduit 192. The other input of differential pressure transducer 190 is exposed to atmospheric pressure contained in damper chamber 160. Thus, as shown in FIG. 8b, an upwardly bowed "shallow curve" symbol is included in differential pressure transducer 190 to signify that the pressure in reservoir chamber 136 is slightly higher than the atmospheric pressure in damper chamber 160. However, the pressure in reservoir chamber 136 is not yet high enough as compared to atmospheric pressure in damper chamber 160 to cause reservoir pressure detector 186 to send a signal that will cause circuit 218 to illuminate ready-to-test signal light "R" 210.

Turning now to FIG. 8c, it will be seen that the test operator has continued to reciprocate pump handle 116 causing pump 138 to pressurize reservoir chamber 136 to a level that is high enough to cause full deflection of differential pressure transducer 190. This full defection is represented by the solid line, upwardly bowed "steep curve" symbol included in the differential pressure transducer 190 in reservoir pressure detector 186. As shown in FIG. 8c, the differential pressure transducer 190 in reservoir pressure detector 186 has deflected upwardly because the pressure level in reservoir chamber 136 is much greater than the atmospheric pressure level in damper chamber 160. In fact, reservoir pressure detector 186 has sensed that the pressure level in reservoir chamber 136 equaled or exceeded the target pressure level (e.g. 37 inches of water) and has caused circuit 218 to illuminate the ready-to-test signal light "R" 210.

It should be noted that at the stage shown in FIG. 8c, the test operator has not yet depressed valve operator 173 to manually actuate flow control valve 174. The only steps that have been taken so far are to pick up the test unit 112 and use pump 138 to pressurize reservoir chamber 136 to a level high enough to cause the ready-to-test signal light "R" 210 to illuminate. If the test operator would continue using pump 138 to pressurize chamber 136, any excess pressure in reservoir 136 would be vented to the atmosphere through pressure-relief valve "R/V" 195 to the atmosphere as shown diagrammatically in FIG. 8c. In a preferred circuit in accordance within the present invention, the vibration-sensitive trembler switch 222 is configured to "expect" some "action" such as operation of pump 138 with a preset time period after the test unit 112 is first moved by the test operator and to shut off automatically if no such action is noted.

Once the ready-to-test signal light "R" is illuminated, the test operator can proceed to the next step illustrated diagrammatically in FIG. 8d. At this time, the test operator using a finger, manually depresses valve operator (e.g. a spring-loaded push button) 173 to cause flow control valve 174 to move from its normally closed position to an opened position. In this opened position, pressurized air is allowed to flow from reservoir chamber 136 to each of the first and second control orifices 156 and 158 in the manner shown in FIG. 8d. Pressurized air is vented from reservoir chamber 136 and flows through switch intake conduit 175, flow control valve 174, and switch discharge conduit 180 to reach flow junction 178. At that point, some of the pressurized air flows through first air supply conduit 182 into first control orifice 156 and some of the pressurized air flows simultaneously through second air supply conduit 184 into second control orifice 158.

The pressurized air flowing through first control orifice 156 passes through conduit 162 and into damper chamber 160. Pressurized air now extant in damper chamber 160 is allowed to vent to the atmosphere through conduit 164 and master orifice 154 at a specified rate defined by master orifice 154. The master orifice 154 is calibrated to set the minimum acceptable leak rate for a cap to be tested 128 in cap base 124. Pressurized air passing through second control orifice 158 passes through air supply conduit 166 and pressurized air supply hose 130 to reach base chamber 126.

At the stage shown in FIG. 8*d*, cap leakage detector 196 is detecting that the pressure level in first passage 162, 160, 164 is equivalent to the pressure level in second passage 166, 130, 126. This equivalence in pressure is indicated by the flat line symbol provided in the differential pressure transducer 198 included in cap leakage detector 196. At this point, circuit 218 functions to cause passing signal light "P" and failing signal light "F" to illuminate in an alternating sequence (i.e. strobe) as represented by arrow 219. During this time period, the test operator continues to push valve operator 173 to its actuated position as shown in FIG. 8*d*. The strobing illumination of these signal lights will eventually stop when the pressure level in reservoir chamber 136 is detected by reservoir pressure detector 186 to be equivalent to the pressure level in the first passage 162, 160, 164 formed in meter block 152. As shown diagrammatically using an upwardly bowed shallow curve symbol in differential pressure transducer 190 in FIG. 8*d*, at this stage, the pressure level in reservoir chamber 136 remains slightly higher than the pressure level in damper chamber 160 so the strobing illumination of passing and failing signal lights "P" and "F" continue. After a time period of about five to seven seconds, the strobing illumination of signal lights "P" and "F" will normally stop.

When the operator presses the valve operator 173 in pneumatic test actuator switch 172, pressure rises in first passage 162, 160, 164 between first control orifice 156 and master orifice 154 and this rising pressure is communicated to one input of cap leakage detector 196 via conduits 188, 199. Simultaneously, the pressure communicated to the other input of cap leakage detector 196 via conduits 197, 200 drops at a slower rate as it is expanded charging the entire tester circuit. When a present "parity" or "equilibrium" value is reached between these two inputs (not zero) the electronics circuit is alerted that flow stability between the first and second passages has been achieved and a reading for pass/fail can be taken from cap leakage detector 196. This "parity" measurement eliminates need for any physical off/on switch to initiate electronics.

The detection circuit in accordance with the present invention includes activation means for determining when detection is appropriate. In lieu of the activation means just described, such means may include a mechanically activated electrical switch coupled to the pneumatic test actuator switch 172 and further equipped with a timer circuit which causes a predetermined time interval to expire between switch activation and pass/fail determination. Alternate activation means may include a second pressure transducer which detects pressure rise to a predetermined level in either the first or second passage and then activates the detection circuit for pass/fail determination.

Turning now to FIG. 8*e*, it will be seen that reservoir pressure detector 186 has detected that the pressure level in reservoir chamber 136 is substantially equivalent to the pressure level in damper chamber 160. This is illustrated diagrammatically by using a straight line symbol in the differential pressure transducer 190 included in reservoir pressure detector 186. Because reservoir pressure detector 186 has detected that the pressure level in reservoir chamber 136 is substantially equivalent to the pressure level in damper chamber 160, the strobing illumination of passing and failing signal lights "P" and "F" has now stopped.

As also shown in FIG. 8*e*, a cap that has a poor seal ring and is thus unable to pass the test specification established by fuel cap leakage test system 110 has now been installed in cap base 124. Cap leakage detector 196 has detected that the pressure in first passage 162, 160, 164 is greater than the pressure level in second passage 166, 130, 126, and thus failing signal light "F" has been illuminated to indicate that cap 128 is a failing cap. Dotted air flow lines are shown in second passage 166, 130, 126 to signify that the pressure in that second passage is lower than the pressure in first passage 162, 160, 164. The pressure in the second passage is lower because pressurized air being conducted to base chamber 126 is leaking at leak symbol 129 at an unacceptable rate from base chamber 126 around a poor seal (not shown) appended to cap 128 that is undergoing a leakage test. It should be noted that the test operator is continuing to depress valve operator 173 manually during this stage of the test as shown in FIG. 8*e*.

FIG. 8*e* also shows that test information indicating a failing cap is provided to a remote host computer 132 by a communication line 134 and network at the same time the test is being conducted by the test operator. This is helpful in the case of state inspections where a central state inspection agency wishes to know the results of any particular fuel cap test at the time that the test is occurring. The information about the vehicle identification and the test results are communicated instantaneously to a remote host computer by a circuit 218 using a communication line 134 and network so that this information can be recorded at the central state inspection agency database 133 along with the vehicle identification number and any other related or vehicle owner information for future use.

FIG. 8*f* is a view very similar to the diagrammatic view shown in FIG. 8*e* but in this case, the cap 128 to be tested is a "passing" cap. In other words, the cap 128 either does not leak at all or leaks at a rate that is lower than the rate that pressurized air "leaks" (i.e. is discharged through) master orifice 154 formed in meter block 152. As shown in FIG. 8*f*, the pressure level of pressurized air in second passage 166, 130, 126 is greater than the pressure level of pressurized air in first passage 162, 160, 164. This difference in pressure is illustrated diagrammatically by a downwardly bowed shallow curve symbol in the differential pressure transducer 198 included in cap leakage detector 196. As shown in FIG. 8*f*, cap leakage detector 196 has instructed circuit 218 to illuminate passing signal light "P" to indicate that the cap 128 being tested does not leak at all or leaks at a low rate within an acceptable specified range. Again, information about the passing results of this test are communicated to a remote host computer 132 by a communication line 134 and network for later use.

In the course of conducting a test, if neither the passing or failing signal lights "P" and "F" are illuminated in the normal time interval, the test operator should continue to hold the push button 173 for a few seconds, and circuit 218 will cause both the passing signal light "P" and the failing signal light "F" to come on simultaneously for a moment. This result indicates "no test" and the procedure described above should be repeated.

After completing a fuel cap leakage test, the test operator will remove the vehicle cap 128 from cap base 124 and reinstall it on the vehicle (not shown) following the normal manufacturer's instructions. The test operator will then place the test unit 112 in a designated storage location until it is needed for the next test. Circuit 218 will cause the electronics module 210 to shut down approximately one minute after the test unit 112 has been deposited in its designated storage location. The test unit 112 will remain inactive until the test unit 112 is moved subsequently by a test operator prior to a next testing sequence.

In the case of a low battery 220, as battery charge level decreases, circuit 218 will cause the low battery signal light "B" to pulse off and on. The test unit 112 will continue to operate until the battery 220 falls below a minimum voltage.

In a presently preferred embodiment, test unit 112 has no manual off-on switch, and all actuation is controlled by a motion-activated switch 222. If test unit 112 is inactive for one minute, whether or not the ready-to-test light "R" 210 is illuminated, the test unit 112 will become inactive.

In a presently preferred embodiment, if an incorrect test procedure is used by an operator that will affect accuracy of a test by a test operator, the test unit will not give a pass or fail indication, but will flash both passing and failing signal lights "P" and "F" briefly and then lights "P" and "F" will cease flashing. Pumping the pump 138 to rebuild test pressure in reservoir chamber 136 will not reactivate the test unit 122. For example, if the test operator removes his/her finger from the valve operator 173 during a test, then presses the valve operator 173 once again to continue the test, the test unit 112 will give a "no test" indication.

Figure 13:
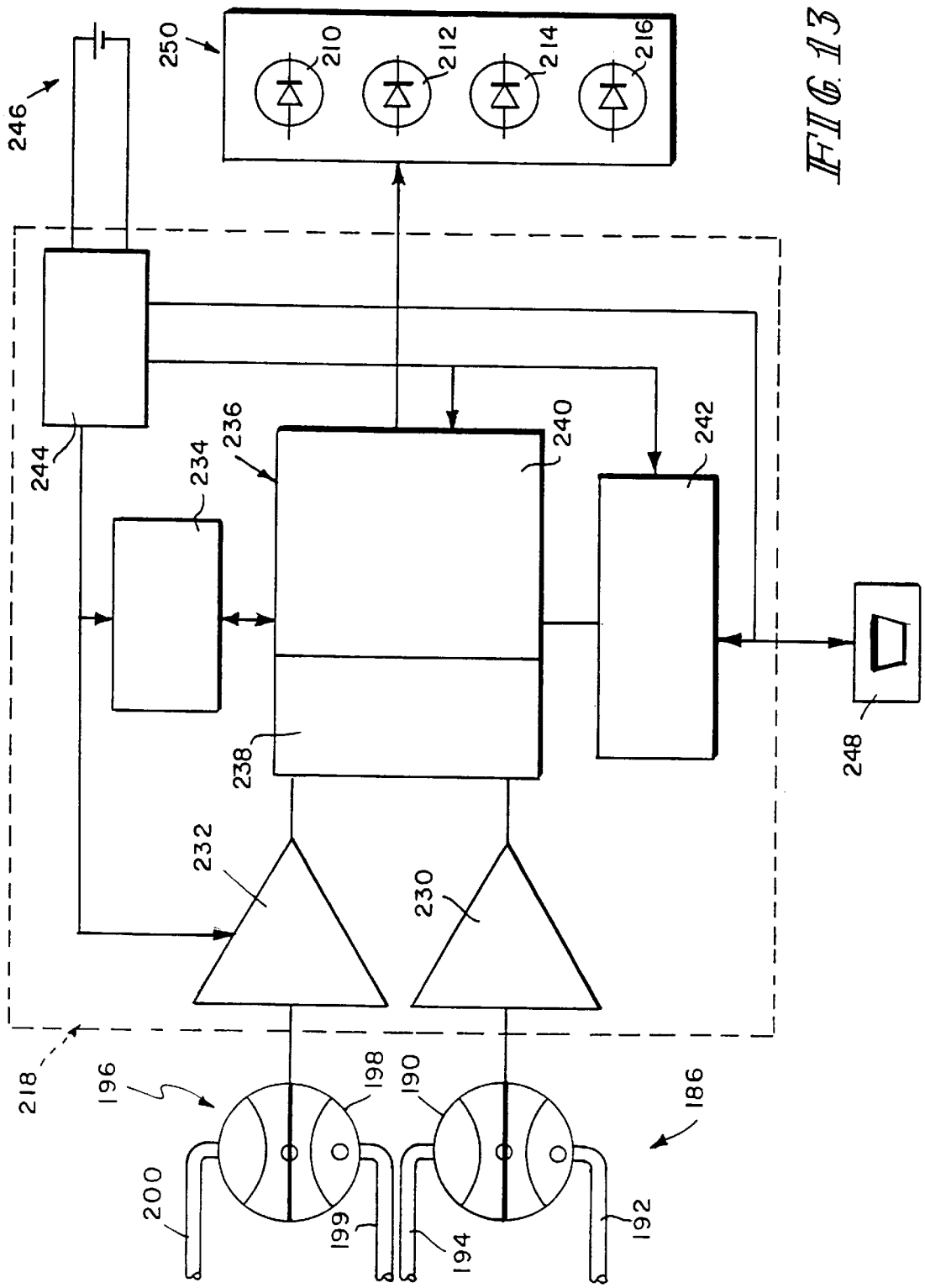
FIG. 13 is a block diagram of a control circuit for use in the tester of FIG. 7.

A block diagram showing circuit 218 and other components mounted in electronics module 120 is illustrated in FIG. 13. A description of this diagram is provided below. Circuit 218 includes supply pressure analog circuitry 230, differential pressure analog circuitry 232, memory 234 including EEPROM, RAM, etc., a digital microprocessor 236 including MUX Analog-to-Digital converter 238 and a digital micro-controller 240, a communication interface 242, power supply management 244, power supply 246, a communication port connector (and external power input) 248, an annunciator 250.

The controller circuitry is a digital microprocessor which reads four analog inputs by analog-to-digital conversion (A/D):

1) A cap leakage detector transducer 198
2) A temperature sensing device mounted in, on, or near the cap leakage detector transducer 198 (for temperature compensation)
3) A reservoir pressure detector transducer 190
4) Battery voltage.

The power supply 246 for the portable device 112 is a standard 9 volt alkaline battery. This 9 volt input is regulated to 5 Vdc for the microprocessor 236, while other circuits operate from the battery voltage. The battery voltage will be monitored by the controller 240 and a "Low Battery" LED turned on when the battery voltage discharges.

A tilt switch and voltage divider circuit provide transient voltage inputs at an input to the micro-controller 240 whenever the test unit 112 is in motion (being handled). If and when these transient signals stop for longer than about one minute (or some other specified time period), the micro-controller 240 shuts power off to the rest of the circuitry by use of a solid-state logic activated switch. This is referred to as "Sleep Mode". This feature reduces battery consumption when the unit is not in use.

An input for external power is provided at the communication connector 248. This bypasses the internal battery 246.

The communication interface 242 is an RJ11 or RJ45 modular connector, providing an RS232 serial communications protocol. This allows the tester 112 to indicate the status of the test by responding to commands sent by a host computer 132. An interface integrated circuit is used to convert the 0/5 Volt signals from the microprocessor the ±10 to 12 Volt signals required by the RS232 standard.

The sensor drive and the signal conditioning (each covered in one or more of the patents referenced earlier in this detailed description) provide direct-current voltage levels at the A/D inputs of the microprocessor. These continuously variable linear voltage levels are proportional to the differential pressure at the input of the transducer. Variables are stored in digital memory 234 which correspond to designed thresholds, and measured variables data, as well as text data stored by the manufacturer.

In calibration mode, the microcontroller 240 reads and stores the pressure reading from the cap leakage detector transducer 198 at zero inches of water and the pressure corresponding with the discrimination threshold of flow. These two values are stored in memory 234.

The voltage levels of the reservoir pressure detector transducer 190 are measured at the specified pressures which correspond to a "Ready to Test" differential pressure level, and a "Parity" differential pressure level. These two values are stored in memory 234.

The voltage level of the temperature sensor is determined at room temperature, as well as the slope of the signal with temperature. These values are used in an algorithm to modify the measured variable of the differential pressure sensor. This provides temperature compensation of the differential pressure transducer.

The cap leakage detector transducer 198 is used to measure the differential pressure across the pneumatic bridge, which is proportional to the difference in flow between the fuel cap 128 under test and the established by the first and second passages known fixed orifice. This pressure is compared to the value stored in memory 234 during calibration of the controller 240.

The reservoir pressure detector transducer 190 is used for two distinct purposes. Initially, when the fuel cap 128 is in place, and the tester reservoir 136 is being pumped up, the damper chamber 160 where the fixed orifice is located is at atmospheric pressure. The reservoir pressure detector transducer 190 is measuring the differential pressure between the reservoir 136 and the fixed orifice chamber 160. When the differential pressure reading is greater than the 37 inch water column, the controller indicates "Ready To Test" by turning on an LED, and the tester begins to test for a sudden decrease in differential pressure.

The controller is comparing each reading of the reservoir pressure detector transducer 190 to the previous reading. If the present reading is less than the 37 inches of water threshold, the controller will turn off the "Ready To Test" LED, and no test will occur, UNLESS the present reading is less than the previous reading a significant amount. This "significant amount" is determined by the pneumatic flow, and is intended to discriminate between a slow leakdown of pressure, and an intentional opening of the valve by the operator. The actual value is determined by the manufacturer, and is a function of the volumes and flow rates of the hardware as well as the measurement interval.

Once a valid Test Condition is detected (the readings drop from above 37 inches of water well below the 37 inches of water in one measurement interval), the controller takes readings from all transducers until the "Parity" is reached on the reservoir pressure detector transducer 190, and the measurement of the cap leakage detector transducer 198 is taken, temperature compensated, and compared to the readings stored in memory 234 at the time of calibration.

During the time between the detection of a valid Test Condition, and the reporting of the "Pass" or "Fail" result, the controller indicates it is testing by strobing the LED indicators (which LEDs are determined by the manufacturer). If the pressure reading of the cap leakage detector transducer 198 is equal to or greater than the stored reading, the controller turns on the "PASS" LED. Otherwise, the controller turns on the "FAIL" LED. The controller holds the LED on for 10 seconds, and returns to measuring the inputs to determine if the system is "Ready To Test", repeating this logic. During this operation, the system is able to continually monitor and indicate via and LED if there is a "Low Battery" condition.

During normal operation, the system 110 is also able to receive and respond to several commands on the serial interface, responding each time with the status of the tester ("Ready To Test", "Pass", "Fail", "Not Ready To Test", and others). The host computer 132 can issue a "Reset" command, causing the program to be reset to the beginning of this sequence, after performing it's start-up system check.

The 37 inches of water differential pressure for Ready To Test threshold stated here was chosen through testing to ensure that in typical tests, a minimum of 30 inches of water of gauge pressure was present at the base chamber 126 at the moment of PASS/FAIL detection.

The variables data is stored in memory 234 at the time of calibration, along with other information such as the serial number, design setpoints, date, program revision number, calibration system information, etc. Each time a "PASS" or "FAIL" indication is made, a number is incremented in memory which can be downloaded through the communication interface to a host computer 132 for purposes of statistical data collection. This method allows a running ratio of PASS-to-FAIL tests.

The following circuit diagram description identifies specific integrated circuits and other components and in many cases specific sources for these. Specific terminal and pin names and numbers are generally given in connection with these for the purposes of completeness. These terminal and pin identifiers are provided for these specifically identified components. This does not constitute a representation, nor should any such representation be inferred, that the specific components or sources are the only components available from the same or any other sources capable of performing the necessary functions. Other suitable components available from the same or different sources may not use the same terminal/pin identifiers as those provided in this description.

As previously described, electric circuit 218 includes a cap leakage detector transducer 198 and reservoir pressure detector transducer 190. Transducers 190, 198, respectively, are coupled by conductors 442, 444 to a sawtooth voltage generator 450. Transducers 190, 198 are also coupled through an inverter 482 to the sawtooth voltage generator 450.

Sawtooth voltage generator 450 includes a first difference amplifier 452, the non-inverting input terminal of which is coupled to ground and the inverting input terminal of which is coupled to a negative voltage source (V−) through a 49.9 kohm resistor 456. The output terminal of amplifier 452 is coupled to the inverting input terminal thereof through a 21.0 kohm feedback resistor 458.

Amplifier 452 is connected to the input terminal of an analog switch 462. The control input terminal of switch 462 is supplied with a ramp control (RC) signal which is described below with reference to the circuitry shown in FIG. 14a. The output terminal of switch 462 is coupled to the inverting input terminal of a difference amplifier 466 through a 49.9 kohm resistor 468.

The output terminal of amplifier 452 is also coupled through a 100 kohm resistor 472 to the inverting input terminal of a difference amplifier 470, the non-inverting input terminal of which is coupled to ground and the output terminal of which is coupled through a 100 kohm resistor 474 to the inverting input terminal of amplifier 466. The output terminal of amplifier 470 is coupled to the inverting input terminal thereof through a parallel combination of a 100 kohm feedback resistor 476 and a 0.001 μF feedback capacitor 478.

The output terminal of amplifier 466 is coupled to the inverting input terminal thereof through a 220 pF integrating capacitor 480. Amplifier 466 is coupled to the circuitry shown in FIG. 14a via conductor 486.

The output terminal of inverter 482 is coupled through the parallel combination of a 100 kohm feedback resistor 488 and a 47 pF feedback capacitor 490 to the inverting input terminal thereof. The inverting input terminal of inverter 482 is coupled to conductor 486 through a 100 kohm resistor 484.

Figure 14A:
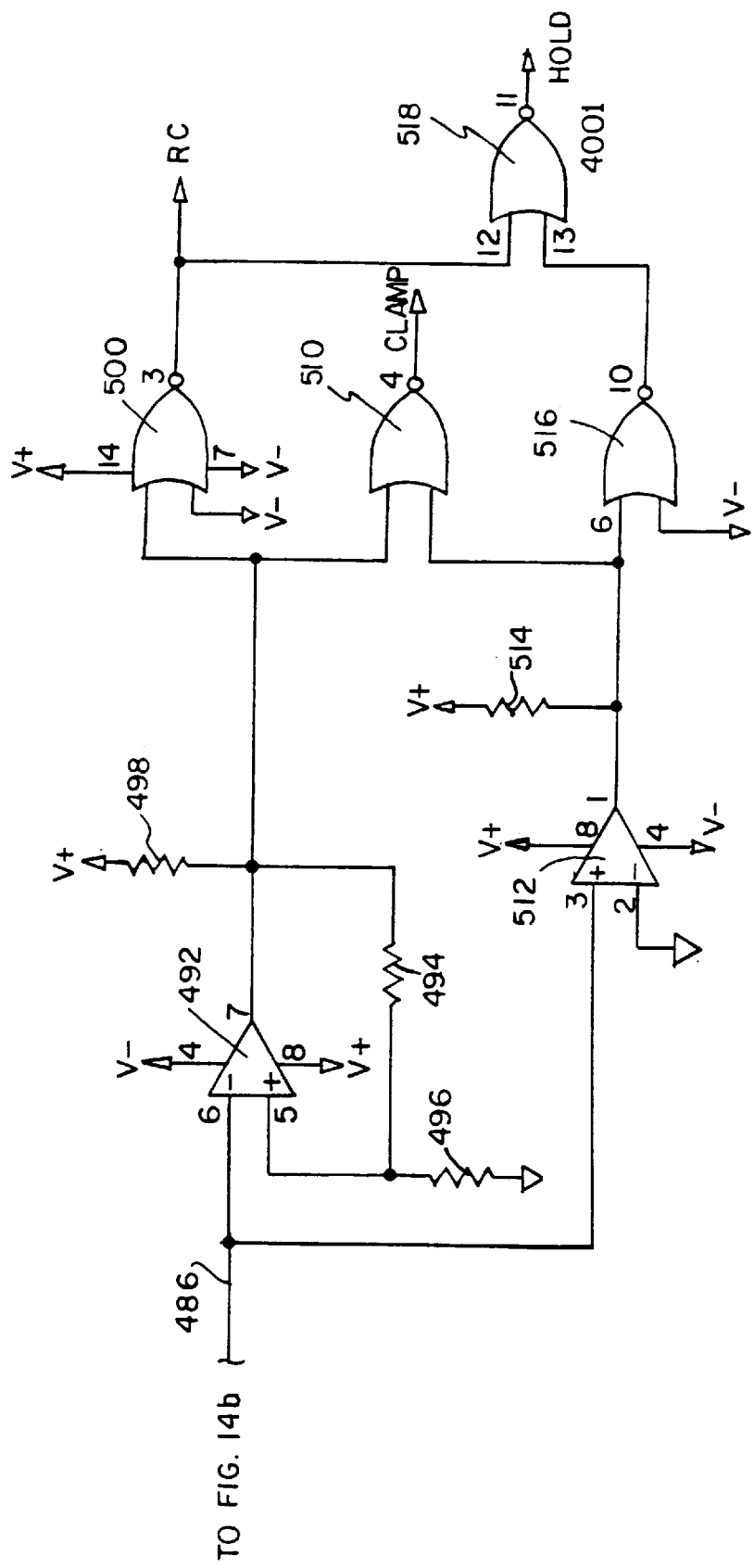
FIGS. 14a–d cooperate to show a schematic of a circuit diagram of the type shown in FIG. 13 for a tester in accordance with the present invention.

Conductor 486 is coupled to the inverting input terminal of a difference amplifier 492, the non-inverting input terminal of which is coupled to the output terminal thereof through a 221 kohm feedback resistor 494 as shown in FIG. 14a. In addition, the non-inverting input terminal of amplifier 492 is coupled to ground through a 100 kohm resistor 496 and the output terminal of amplifier 492 is coupled to a positive voltage source (V+) through a 100 kohm resistor 498.

Electric circuit 218 includes a type 4001 quad NOR gate and the output terminal of amplifier 492 is coupled to input terminals of first and second NOR gates 500, 510 of the quad NOR gate. An input terminal of first NOR gate 500 is coupled to V−. The output terminal of NOR gate 500 provides the ramp control (RC) signal to analog switch 462 of FIG. 14b.

Conductor 486 is also coupled to the non-inverting input terminal of a difference amplifier 512, the inverting input terminal of which is coupled to ground, and the output terminal of which is coupled to V+ through a 100 kohm resistor 514. The output terminal of amplifier 512 is also coupled to an input terminal of NOR gate 510 and to an input terminal of a third NOR gate 516. The other input terminal of NOR gate 516 is coupled to V−.

The output terminal of NOR gate 510 provides a clamp signal in response to the voltages at the output terminals of amplifiers 492 and 512. The clamp signal is coupled to the output circuitry of pressure transducers 190, 198 as described below with reference to FIG. 14b.

The output terminal of NOR gate 516 is coupled to an input terminal of a fourth NOR gate 518 of the quad NOR gate and the output terminal of NOR gate 500 is coupled to an input terminal of NOR gate 518. The output terminal of NOR gate 518 provides a hold signal that is coupled to output circuitry of pressure transducers 190, 198 as described below with reference to FIG. 14b.

The discussion below with reference to pressure transducer 190, the operation of pressure transducer 190, and supply pressure analog circuitry 230 associated with pressure transducer 190 applies as well to pressure transducer 198, the operation of pressure transducer 198, and differential pressure analog circuitry 232 associated with pressure transducer 198 unless specifically noted otherwise.

Transducer 190 is subjected to the pressures within conduits 188, 192 of leakage tester 110 so that transducer 190 senses pressure differentials established between conduits 188, 192. Transducer 190 is coupled to the inverting input terminal of a difference amplifier 520 the non-inverting input terminal of which is coupled to ground. The output terminal of amplifier 520 is coupled to its inverting input terminal through the parallel combination of a 4.7 pF feedback capacitor 522 and an 825 kohm feedback resistor 524. Additional circuit components such as capacitor 526, resistor 528, and resistor 530 permit adjustment of the feedback resistance and capacitance if necessary. A 2.5 pF feedback capacitor 523 and a 2.0 Mohm feedback resistor 525, which are analogous to capacitor 522 and resistor 524 associated with pressure transducer 190, are included in the circuitry associated with pressure transducer 198.

The output terminal of amplifier 520 is coupled through a series combination of a 0.01 µF coupling capacitor 534 and a 10 kohm resistor 536 to the inverting input terminal of a difference amplifier 532. The common terminal of capacitor 534 and resistor 536 is coupled through a 2.21 kohm resistor 540 to the output terminal of an analog switch 538. The control terminal of switch 538 is supplied with the clamp signal from NOR gate 510 shown in FIG. 14a and the input terminal of switch 538 is coupled to a 0.03 V d.c. source. The output terminal of amplifier 532 is coupled to its non-inverting input terminal to configure amplifier 532 as a unity gain inverter.

Capacitor 534, switch 538, and amplifier 532 cooperate to provide a 0.03 V d.c. offset voltage to the pressure voltage signal of amplifier 520. Amplifier 532 inverts this pressure voltage at its output terminal.

The circuitry associated with pressure transducer 198 which is analogous to capacitor 534, switch 538, and amplifier 532 associated with transducer 190, offsets the output pressure voltage signal created by transducer 198 to a different voltage range than the output voltage range produced at the output terminal of amplifier 532. The circuitry associated with pressure transducer 198 includes circuit components that are generally similar to capacitor 534, switch 538, and amplifier 532. The circuitry associated with pressure transducer 198 also includes a difference amplifier 542, the non-inverting input terminal of which is coupled to digital ground through a 6.98 kohm resistor 544 and to analog ground through a 200 kohm resistor 546.

The output terminal of amplifier 542 is connected directly to its inverting input terminal in unity gain buffer configuration. The output terminal of amplifier 542 is also coupled to digital ground through the series combination of a 1.50 kohm resistor 548 and a 649 Ohm resistor 550. The common terminal of resistors 548, 550 provides the 0.03 V d.c. that is connected to analog switch 538 as previously described. The output pressure voltage supplied by pressure transducer 198 is offset in a manner similar to the 0.03 V offset of the output pressure voltage signal created by pressure transducer 190 described above.

Figure 14B:
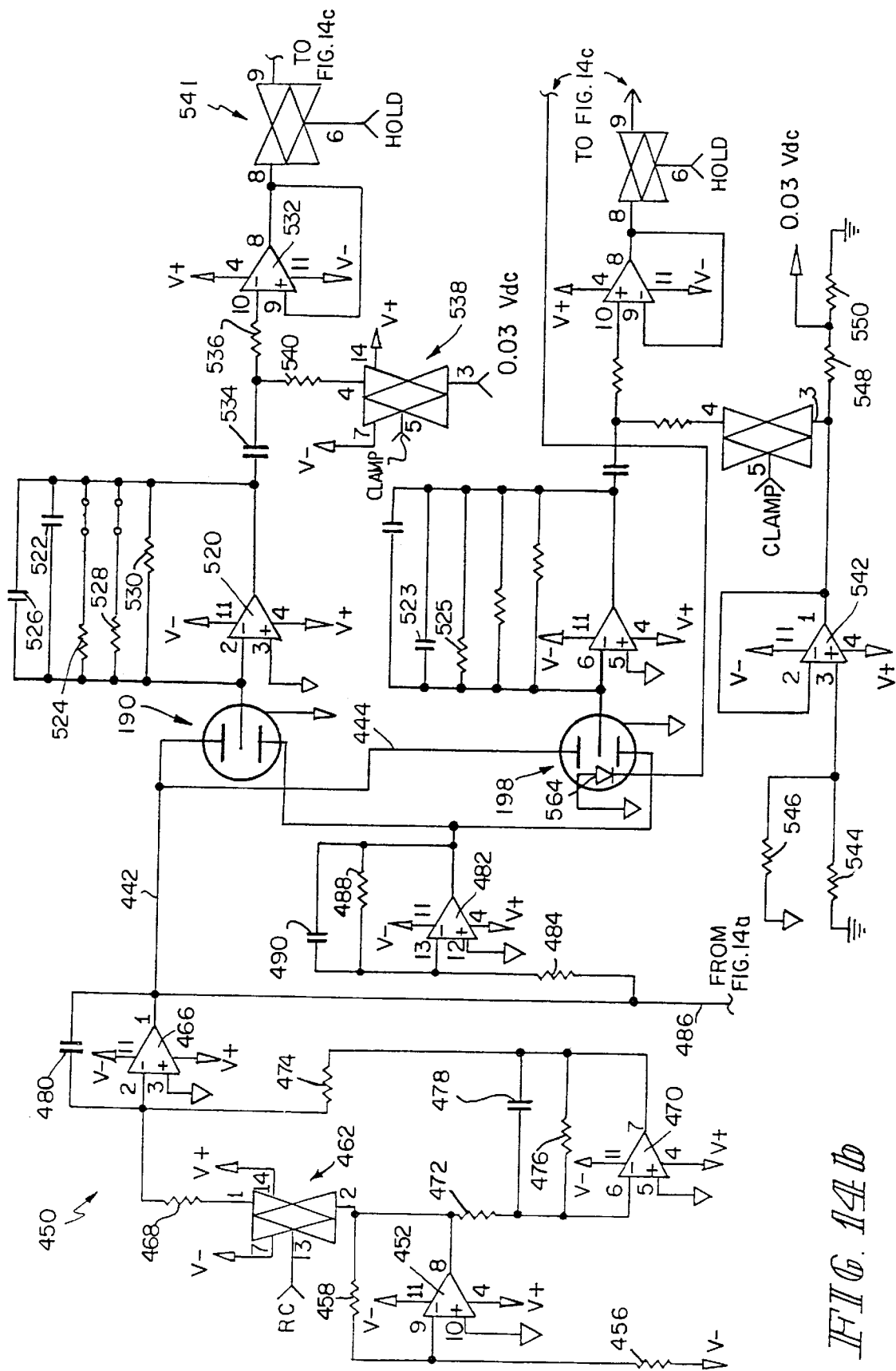
Figure 14C:
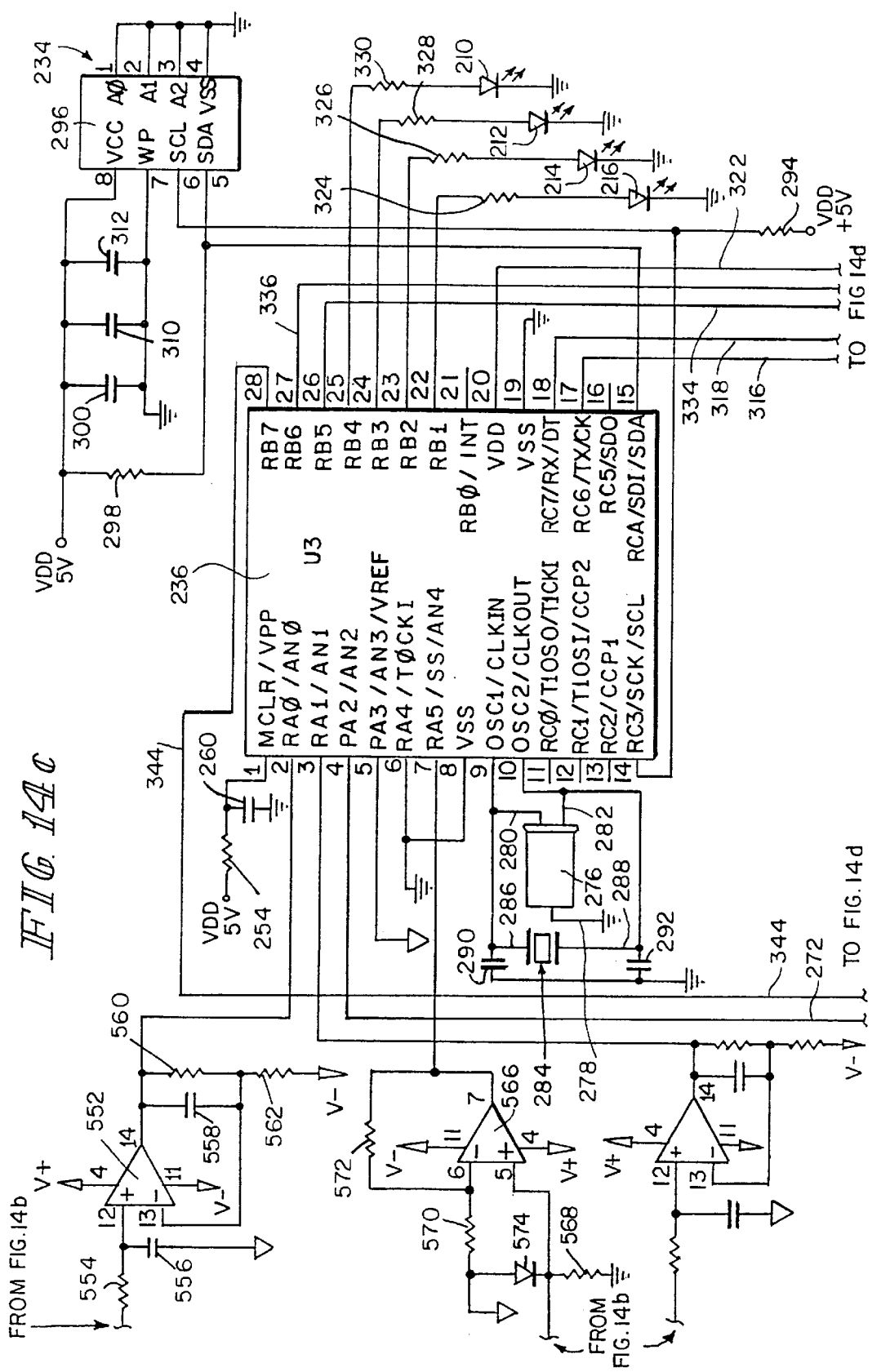

The output terminal of amplifier 532 is coupled to the input terminal of an analog switch 541, the control terminal of which is supplied with the hold signal from NOR gate 518 shown in FIG. 14a and the output terminal of which is coupled to the non-inverting input terminal of a difference amplifier 552 through a 2.21 kohm resistor 554 shown in FIG. 14c. The non-inverting input terminal of amplifier 552 is also coupled to ground through a 0.01 µF capacitor 556. The output terminal of amplifier 552 is coupled through the parallel combination of a 220 pF feedback capacitor 558 and a 909 kohm feedback resistor 560 to its inverting input terminal. In addition, the inverting input terminal of amplifier 552 is coupled to V− through a 100 kohm resistor 562. The voltage at the output terminal of amplifier 552 is a measure of the pressure differential between conduits 188, 192 which is sensed by pressure transducer 190.

Pressure transducer 198 can include a diode 564, the anode of which is coupled to ground as shown in FIG. 14b, and the cathode of which is coupled to the non-inverting input terminal of a difference amplifier 566 as shown in FIG. 14c. The non-inverting input terminal of amplifier 566 is also coupled to digital ground through a 49.9 kohm resistor 568 and the inverting input terminal of amplifier 566 is coupled to analog ground through a 49.9 kohm resistor 570. The output terminal of amplifier 566 is coupled to its inverting input terminal through a 210 kohm feedback resistor 572 as shown in FIG. 14c. An MMBD914 glass melf diode 574, the anode of which is coupled to analog ground and the cathode of which is coupled to the non-inverting input terminal of amplifier 566, can be included in circuit 218 as well.

With reference to the above description of electric circuit 218, amplifiers 452, 466, 470, 482, 520, 532, 542, 552, 566 illustratively are all National Semiconductor LM6134BIM operational amplifiers. Amplifiers 492, 512 illustratively are National Semiconductor TLC372M operational amplifiers.

As previously described, electric circuit 218 includes a microprocessor 236 having analog to digital converter 238 and digital microcontroller 240. Microprocessor 236 illustratively is a 28-pin programmable interrupt controller, Microchip model PIC16C73 controller. Pin 1 (MCLR/VPP) of microprocessor 236 is coupled through a 100 kohm resistor 254 to a five volt power supply (hereinafter VDD). Pin 1 (MCLR/VPP) of microprocessor 236 is also coupled to ground through a 0.1 µF capacitor 260.

Pin 2 (RA0/AN0) of microprocessor 236 is coupled to the output terminal of amplifier 552 so that microprocessor 236 is supplied with a first conditioned analog signal which corresponds to the analog pressure sensed by capacitive transducer 190. Similarly, pin 3 (RA1/AN1) of microprocessor 236 is coupled to the output terminal of the amplifier analogous to amplifier 552 but associated with pressure transducer 198. Thus, microprocessor 236 receives a second conditioned analog signal which corresponds to the analog pressure sensed by capacitive transducer 198. Analog-to-digital converter 238 of microprocessor 236 converts the first and second conditioned analog signals to respective digital values.

A conductor 272 supplies pin 4 (PA2/AN2) of microprocessor 236 with an analog battery voltage signal from circuitry associated with power supply management 244. Analog-to-digital converter 238 of microprocessor 236 converts the battery voltage signal to a digital value and compares the digital value with a preprogrammed digital value stored in memory 234 to determine whether the battery voltage is low. Pin 6 (RA4/T0CKI), pin 8 (VSS), and pin 19 (VSS) of microprocessor 236 are coupled to digital ground and pin 5 (PA3/AN3/VREF) is coupled to analog ground as shown in FIG. 14c. Pin 7 (RA5/SS/AN4) of microprocessor 236 is coupled to the output terminal of amplifier 566.

An XCR1 ceramic oscillator 276, which is illustratively a Panasonic EFOEC2004 ceramic oscillator, can provide the clock signal to run microprocessor 236. Oscillator 276 includes a first lead 278 coupled to ground, a second lead 280 coupled to pin 9 (OSC1/CLKIN) of microprocessor 236, and a third lead 282 coupled to pin 10 (OSC2/CLKOUT) of microprocessor 236 as shown in FIG. 14c. A 20 kHz piezoelectric crystal 284 having a first lead 286 connected to pin 9 of microprocessor 236 and having a second lead 288 connected to pin 10 of microprocessor 236, can provide the clock signal to run microprocessor 236. Lead 286 of piezoelectric crystal 284 and pin 9 of microprocessor 236 are coupled to ground through a first 33 pF capacitor 290 and lead 288 of piezoelectric crystal 284 and pin 10 of microprocessor 236 are coupled to ground through a second 33 pF capacitor 292.

Pin 11 (RC0/T1OSO/T1CKI), pin 12 (RC1/T1OSI/CCP2), pin 13 (RC2/CCP1), pin 16 (RC5/SDO), and pin 21 (RB0/INT) are all open. Pin 14 (RC3/SCK/SCL) of microprocessor 236 is coupled to VDD through a 10 kohm resistor 294 as shown in FIG. 14c. Pin 14 of microprocessor 236 is also coupled to pin 6 (SCL) of an EEPROM 296 which illustratively is a Microchip 24AA02 EEPROM.

Pin 1 (A0), pin 2 (A1), pin 3 (A2), and pin 4 (VSS) of EEPROM 296 are coupled to ground as shown in FIG. 14c. Pin 8 (VCC) of EEPROM 296 is coupled to VDD. Pin 7 (WP) of EEPROM 296 is coupled to ground. Parallel 0.1 $\mu$F, 0.01 $\mu$F, 0.001 $\mu$F capacitors 300, 310, 312, respectively, are coupled across pins 7 and 8 of EEPROM 296. Capacitors 300, 310, 312 are placed as close as possible to chip 296. Pin 5 (SDA) of chip 296 is coupled through a 10 kohm resistor 298 to VDD. Pin 5 of chip 296 is also coupled to pin 15 (RC4/SDI/SDA) of microprocessor 236.

Figure 14D:
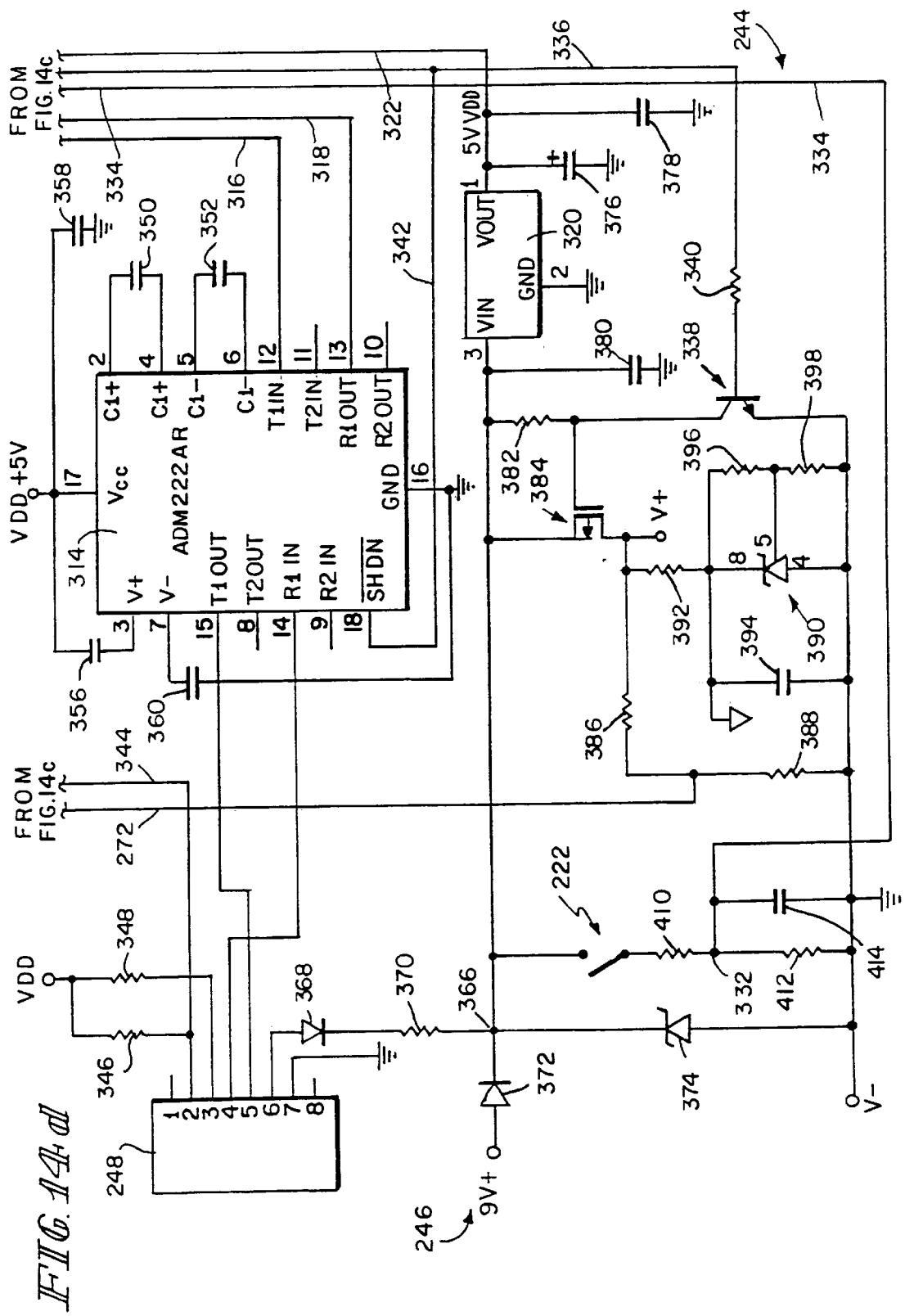

Pin 17 (RC6/TX/CK) of microprocessor 236 is coupled to pin 12 (T1in) of an RS232 port 314, illustratively an Analog Devices ADM222AR, via conductor 316 as shown in FIGS. 14c and 14d. Pin 18 (RC7/RX/DT) of microprocessor 236 is coupled to pin 13 (R1out) of port 314 via conductor 318. Pin 20 (VDD) of microprocessor 236 is coupled to pin 1 (VOUT) of a voltage regulator 320 via conductor 322. Voltage regulator 320 illustratively is a National Semiconductor 5V regulator and is part of power supply management 244 of circuit 218. Microprocessor 236 receives operating power from voltage regulator 320.

Pin 22 (RB1) of microprocessor 236 is coupled to the anode of LOBATT LED 216 through a 301 Ohm resistor 324. The cathode of LED 216 is coupled to ground as shown in FIG. 14c. LED 316 illustratively is an LAY5374X yellow diode. Pin 23 (RB2) of microprocessor 236 is coupled to the anode of FAIL LED 214 through a 604 Ohm resistor 326. The cathode of LED 214 is coupled to ground. LED 214 illustratively is an LVR5374X red diode. Pin 24 (RB3) of microprocessor 236 is coupled to the anode of PASS LED 212 through a 301 Ohm current-limiting resistor 328. The cathode of LED 212 is coupled to ground. LED 212 illustratively is an LPG5374X green diode. Pin 22 (RB1) of microprocessor 236 is coupled to the anode of READY TO TEST LED 210 through a 301 Ohm current-limiting resistor 330. The cathode of LED 210 is coupled to ground. LED 210 illustratively is an LAY5374X yellow diode.

Pin 26 of microprocessor 236 is coupled to a node 332 of power supply management 244 via conductor 334 as shown in FIGS. 14c and 14d. Pin 27 of microprocessor 236 is coupled to the base of an npn transistor 338, illustratively a 2N5089, through a 100 kohm resistor 340 via a conductor 336. Conductor 336 is also coupled to pin 18 ($\overline{\text{SHDN}}$) of port 314 by conductor 342. Pin 28 of microprocessor 236 is coupled to terminal 2 of communication port connector 248 via conductor 344 as shown in FIGS. 14c and 14d. Conductor 344 is also coupled to VDD through a 100 kohm resistor 346. VDD is also coupled to terminal 3 of connector 248 through a 100 kohm resistor 348.

As previously described, pins 17, 18 of microprocessor 236 are coupled to pins 12, 13 of port 314 by conductors 316, 318, respectively. Pin 2 (C1+) of port 314 is coupled to pin 4 (C1+) thereof through a 0.1 $\mu$F capacitor 350 as shown in FIG. 14d. Pin 5 (C1−) of port 314 is coupled to pin 6 (C1−) thereof through a 0.1 $\mu$F capacitor 352. Pin 3 (V+) of port 314 is coupled to VDD through a 0.1 $\mu$F capacitor 356. VDD is coupled to pin 17 ($V_{cc}$) of port 314 and to ground through a 0.1 $\mu$F capacitor 358.

Pin 7 (V−) of port 314 is coupled to ground through a 0.1 $\mu$F capacitor 360. Pin 8 (T2out), pin 9 (R2in), pin 10 (R2out), and pin 11 (T2in) of port 314 are all open as shown in FIG. 14d. Pin 14 (R1in) of port 314 is coupled to terminal 4 of communication port connector 248 and pin 15 (T1out) of port 314 is connected to terminal 5 of communication port connector 248 as shown in FIG. 14d. Pin 16 (GND) of port 314 is coupled to ground and to pin 7 of port 314 through capacitor 360.

As previously described, communications port connector 248 can be coupled to an external computer 132 so that control instructions and data can be transmitted back and forth between microprocessor 236 and computer 132. Terminal 1 and terminal 8 of connector 248 are open and terminal 6 of connector 248 is coupled to a node 366 of power supply management 244 through the series combination of a diode 368, illustratively a type 1N914B diode, and a 10 Ohm ½ W resistor 370 as shown in FIG. 14d. Terminal 7 of connector 248 is coupled to ground.

Communication port connector 248 provides an RS 232 serial communications protocol as previously described. Communication port connector 248 illustratively is an RJ45 AMP 52025-4 connector.

As previously described, circuit 218 includes power supply 246. Power supply 246 includes a standard 9 volt alkaline battery, the positive terminal (+9 V) of which is connected to node 366 of power supply management 244 through a diode 372, illustratively a type 1N914B diode. The negative terminal (−9 V) of the battery is coupled to ground and also to node 366 through a 4740 10V 1W zener diode 374 as shown in FIG. 14d. In addition, pin 3 (VIN) of voltage regulator 320 is coupled to node 366. Pin 2 (GND) of voltage regulator 320 is coupled to ground and pin 1 (VOUT) of voltage regulator 320 provides the 5 volt d.c. VDD voltage. Voltage regulator 320 illustratively is a National Semiconductor LM2936-5 low dropout voltage regulator.

A 10 $\mu$F 16V Tantalum capacitor 376 and a 0.1 $\mu$F capacitor 378 are coupled in parallel between pin 1 of voltage regulator 320 and ground as shown in FIG. 14d. Pin 3 (VIN) of voltage regulator 320 is coupled to ground through a 0.1 $\mu$F capacitor 380. In addition, pin 3 of voltage regulator 320 is coupled through a 100 kohm resistor 382 to the collector electrode of transistor 338 and to the gate electrode of a FET 384. FET 384 illustratively is a type ZVP3306A MOSFET. The source electrode of transistor 384 is coupled directly to pin 3 of voltage regulator 320.

The drain electrode of FET 384 is coupled to digital ground through the series combination of a 300 kohm resistor 386 and a 124 kohm resistor 388. The common terminal of resistors 386, 388 is coupled to pin 4 of microprocessor 236 via conductor 272.

The series combination of a programmable zener diode 390 and a 20 kohm resistor 392 is coupled between analog ground and the drain of FET 384. Programmable zener diode 390 illustratively is a National Semiconductor LM385M-Adj. band gap precision voltage reference.

A 1 $\mu$F 16 V tantalum capacitor 394 is coupled between pin 8 of diode 390 and pin 4 thereof. The emitter electrode of transistor 338 and the negative terminal of the 9 V battery are both coupled to digital ground. Pin 8 of diode 390 is coupled to pin 4 thereof through the series combination of two resistors, a 249 kohm resistor 396 and a 385 kohm resistor 398. Pin 5 of diode 390 is coupled to the common terminal of resistor 396 and resistor 398.

The common terminal of pin 3 of voltage regulator 320, the cathode of diode 372, the cathode of diode 374, and the drain of FET 384 is coupled to ground through the series combination of tilt switch 222, an 808 kohm resistor 410, and a 909 kohm resistor 412 as shown in FIG. 14d. Conductor 334 from pin 26 of microprocessor 236 is coupled to the common terminal of resistor 410 and resistor 412 at node 332 as previously described. A 0.01 µF capacitor 414 is coupled from node 332 to ground in parallel with resistor 412.

Tilt switch 222 illustratively is a Comus model CW1600-1 ball bearing tilt switch. Tilt switch 222 is coupled to pin 26 of microprocessor 236 via conductor 334.

Although the invention has been described in detail with reference to certain preferred embodiments, variations and modifications exist within the scope and spirit of the invention as described and defined in the following claims.

I claim:

1. A fuel cap leakage tester comprising:
   an inlet for receiving a source of pressure,
   a first outlet connected to said inlet by a first passage having a first restriction,
   a second outlet for removably receiving a fuel cap to be tested and connected to said inlet by a second passage having a second restriction equal to said first restriction,
   a third restriction in said first passage between said first restriction and said first outlet having a flow rate, and
   an indicator connected to said first passage between said first and third restrictions and to said second path between said second restriction and said second outlet for indicating if the leakage at said second outlet with a cap therein is greater or less than the flow rate of said third restriction.

2. The tester of claim 1, wherein said indicator is a U-shaped manometer having each leg connected to a respective first and second passage.

3. The tester of claim 1, wherein said indicator is a pneumatic differential pressure gauge.

4. The tester of claim 1, wherein said indicator is an electrical differential pressure gauge.

5. The tester of claim 1, including a valve at said inlet connecting and disconnecting said source of pressure to said first and second passages for initiating and terminating a test.

6. The tester of claim 1, wherein said indicator qualitatively indicates if the leakage at said second outlet with said cap therein is greater or lesser than the flow rate of said third restriction.

7. The tester of claim 1, including a charged reservoir as said source of pressure and a valve at said inlet connecting and disconnecting said reservoir to said first and second passages for initiating and terminating a test.

8. The tester of claim 7, including a pump for charging said reservoir.

9. A fuel cap leakage tester comprising:
   a reservoir containing a supply of pressurized air,
   a base including a base chamber for receiving a fuel cap to be tested,
   a master orifice having a first specified flow rate at a specified test pressure and communicating with the atmosphere,
   a first supply conduit conducting pressurized air from the reservoir to the master orifice through a first control orifice having a second specified flow rate at the specified test pressure, the first supply conduit including a first passage interconnecting the first control orifice and the master orifice,
   a second supply conduit conducting pressurized air from the reservoir to the base chamber formed in the base through a second control orifice having the second specified flow rate equivalent to the first specified flow rate at the specified test pressure, the second supply conduit including a second passage interconnecting the second control orifice and the base chamber, and
   pass/fail indicator means connected to the first and second passages for indicating a failed fuel cap when a fuel cap to be tested is coupled to the base and the pressure level of pressurized air in the first passage is greater than the pressure level of pressurized air in the second passage and for indicating a passed fuel cap when a fuel cap to be tested is coupled to the base and the pressure level of pressurized air in the first passage is lesser than the pressure level of pressurized air in the second passage.

10. The tester of claim 9, further comprising a housing containing the reservoir, the master orifice, and the first and second supply conduits and a pressurized air supply hose interconnecting the second supply conduit in the housing and the base chamber in the base.

11. The tester of claim 10, further comprising a pump for pressurizing air contained in the reservoir, the pump being coupled to the housing.

12. The tester of claim 10, further comprising an electronics module appended to the housing and wherein the pass/fail indicator means includes a cap leakage detector positioned in the electronics module and coupled to the first and second passages.

13. The tester of claim 12, wherein the cap leakage detector includes a differential pressure transducer having a first input coupled to the first passage to communicate with air in the first passage and a second input coupled to the second passage to communicate with air in the second passage and the pass/fail indicator means further includes a signaling device positioned in the electronics module and coupled to the differential pressure transducer to provide a cap-failing signal when the air pressure at the first input is greater than the air pressure at the second input and a cap-passing signal when the air pressure at the first input is lesser than the air pressure at the second input.

14. The tester of claim 9, wherein the pass/fail indicator means includes a cap leakage detector coupled to the first and second passages and a pass/fail signaling device coupled to the cap leakage detector.

15. The tester of claim 14, wherein the cap leakage detector includes a first differential pressure transducer having two inputs, a first transducer supply conduit communicating air from the first passage to one input of the differential pressure transducer, and a second transducer supply conduit communicating air from the second passage to another input of the first differential pressure transducer.

16. The tester of claim 15, wherein the pass/fail signaling device includes a pass light, a fail light, and circuit means coupled to the pass and fail lights for providing a cap-failing signal to illuminate the fail light when air pressure at said one input of the first differential pressure transducer is greater than the air pressure at said another input of the first differential pressure transducer and for providing a cap-passing signal to illuminate the pass light when air pressure at said one input of the first differential pressure transducer is lesser than the air pressure at said another input of the first differential pressure transducer.

17. The tester of claim 14, further comprising a reservoir pressure detector coupled to the reservoir and to the first passage and ready-to-test indicator means coupled to the reservoir pressure detector for providing a ready-to-test signal to a user once the air pressure in the reservoir reaches a predetermined minimum pressure.

18. The tester of claim 9, wherein the reservoir includes a reservoir chamber and test actuator means for selectively conducting pressurized air from the reservoir chamber to the first and second supply conduits.

19. The tester of claim 18, wherein the test actuator means includes a test actuator switch including a normally closed flow control valve, a switch intake conduit interconnecting the reservoir chamber and the flow control valve, a flow junction connected to the first and second supply conduits, and a switch discharge conduit interconnecting the flow control valve and the flow junction.

20. The tester of claim 19, wherein the normally closed flow control valve is movable between a closed position blocking flow of pressurized air from the switch intake conduit to the switch discharge conduit and an opened position permitting flow of pressurized air from the switch intake conduit to the switch discharge conduit and the test actuator switch further includes operator means for selectively moving the flow control valve from the closed position to the opened position to cause pressurized air in the reservoir chamber to be supplied to the master orifice through the first supply conduit and to the base chamber through the second supply conduit.

21. The tester of claim 19, further comprising a housing formed to include an interior region and a partition member mounted in the housing to divide the interior region into a first cavity defining the reservoir chamber and a second cavity containing the master orifice, the first and second supply conduits, and the test actuator means.

22. The tester of claim 13, further comprising a housing containing the reservoir chamber, the master orifice, the first and second supply conduits, and the test actuator means.

23. The tester of claim 22, wherein the test actuator means includes a passageway interconnecting the reservoir chamber and the first and second supply conduits, a valve positioned in the passageway for movement between passageway-opening and passageway-closing positions, and a valve operator mounted on the housing and connected to the valve.

24. The tester of claim 9, further comprising output means for connecting the pass/fail indicator means to a communication line adapted to communicate with a computer system so that cap-passing and cap-failing signals generated by the pass/fail indicator means are communicated to the computer system via the communication line.

25. A fuel cap leakage tester comprising:
a master orifice having a first specified flow rate at a specified test pressure corresponding to a predetermined acceptable fuel cap leakage specification,
a first control orifice having a second specified flow rate at the specified test pressure,
a second control orifice having the second specified flow rate at the specified test pressure,
a base including a base chamber for receiving a fuel cap to be tested,
a first passage conducting pressurized air from the first control orifice to the master orifice,
a second passage conducting pressurized air from the second control orifice to the base chamber so that a cap to be tested received in the base chamber is exposed to the pressurized air received in the base chamber,
an air supply generator providing a source of pressurized air at a selected pressure, the air supply being coupled to the first and second control orifices to discharge such pressurized air from the air supply simultaneously into the first passage through the first control orifice to reach the master orifice and into the second passage through the second control orifice to reach the base chamber, and
pass/fail indicator means connected to the first and second passages for indicating a failed fuel cap when a fuel cap to be tested is coupled to the base and the pressure level of pressurized air in the first passage is greater than the pressure level of pressurized air in the second passage and for indicating a passed fuel cap when a fuel cap to be tested is coupled to the base and the pressure levels of pressurized air in the first passage is greater than the flow rate of pressurized air in the second passage.

26. The tester of claim 25, wherein the first passage has a first volume receiving pressurized air and the second passage has a second volume receiving pressurized air equivalent to the first volume so that the flow rates of pressurized air introduced simultaneously into the first and second passage reach equilibrium substantially simultaneously.

27. The tester of claim 26, further comprising a meter block formed to include a damper chamber connected to the master orifice and to the first control orifice.

28. The tester of claim 27, further comprising a housing formed to include an interior region and a partition member mounted in the housing to divide the interior region into a reservoir chamber and a metering chamber, and wherein the meter block is formed to provide the damper chamber with an open mouth and is positioned to lie in the metering chamber in engagement with the partition member to cause the partition member to close the open mouth of the damper chamber.

29. The tester of claim 27, wherein the meter block is also formed to include the master orifice, the first control orifice, and the second control orifice.

30. The tester of claim 25, further comprising a meter block formed to include the master orifice, the first control orifice, and the second control orifice.

31. The tester of claim 30, wherein the meter block is also formed to include the first passage and a portion of the second passage.

32. The tester of claim 30, further comprising a housing containing the air supply generator and including an internal wall and wherein the meter block is positioned to lie within the housing in engagement with the internal wall.

33. The tester of claim 25, further comprising a meter block formed to include the first passage.

34. The tester of claim 33, wherein the meter block is formed to include a damper chamber communicating with the master orifice and an internal passage interconnecting the damper chamber and the first control orifice and cooperating with the damper chamber to define the first passage.

35. The tester of claim 34, wherein the meter block is formed to include the master orifice and the first control orifice.

36. The tester of claim 25, further comprising a meter block formed to include an air supply conduit defining a portion of the second passage.

37. The tester of claim 36, wherein the second passage further includes a pressurized air supply hose interconnecting the air supply conduit formed in the meter block and the base chamber formed in the base.

38. The tester of claim 37, further comprising a housing containing the meter block and wherein the base lies outside of the housing and the pressurized air supply hose extends from the housing to the base.

39. The tester of claim 25, wherein the air supply generator includes a reservoir chamber and test actuator means for selecting conducting pressurized air from the reservoir chamber to the first and second passages.

40. The tester of claim 39, wherein the test actuator means includes a test actuator switch including a normally closed flow control valve, a switch intake conduit interconnecting the reservoir chamber and the flow control valve, and switch discharge means for discharging pressurized air from the flow control valve simultaneously into the first passage through the first control orifice and into the second passage through the second control orifice.

41. The tester of claim 40, wherein the normally closed flow control valve is movable between a closed position blocking flow of pressurized air from the switch intake conduit to the switch discharge means and an opened position permitting flow of pressurized air from the switch intake conduit to the switch discharge means and the test actuator switch further includes operator means for selectively moving the flow control valve from the closed position to the opened position to cause pressurized air in the reservoir chamber to be supplied to the master orifice through the first passage and to the base chamber through the second passage.

42. The tester of claim 41, further comprising a housing formed to include an interior region and a partition member mounted in the housing to divide the interior region into a first cavity defining the reservoir chamber and a second cavity containing the master orifice, the first and second control orifices, the first and second passages, and the test actuator means.

43. The tester of claim 39, further comprising a housing containing the reservoir chamber, the master orifice, the first and second control orifices, the first and second passages, and the test actuator means.

44. The tester of claim 43, wherein the test actuator means includes a passageway interconnecting the reservoir chamber and the first and second passages, a valve positioned in the passageway for movement between passageway-opening and passageway closing positions, and a valve operator mounted on the housing and connected to the valve.

45. The tester of claim 39, wherein the air supply generator further includes a pump for charging the reservoir chamber and further comprising a reservoir pressure detector connected to the reservoir chamber and to the first passage to sense the level of pressure in the reservoir chamber.

46. The tester of claim 25, further comprising output means for connecting the pass/fail indicator means to a communication line adapted to communicate with a computer system so that cap-passing and cap-failing signals generated by the pass/fail indicator means are communicated to the computer system via the communication line.

47. A fuel cap leakage tester comprising:
a reservoir containing a supply of pressurized air,
a base including a base chamber for receiving a fuel cap to be tested,
a master orifice having a first specified flow rate at a specified test pressure and communicating with the atmosphere,
a first supply conduit conducting pressurized air from the reservoir to the master orifice through a first control orifice having a second specified flow rate at the specified test pressure, the first supply conduit including a first passage interconnecting the first control orifice and the master orifice,
a second supply conduit conducting pressurized air from the reservoir to the base chamber formed in the base through a second control orifice having the second specified flow rate equivalent to the first specified flow rate at the specified test pressure, the second supply conduit including a second passage interconnecting the second control orifice and the base chamber,
a cap leakage detector coupled to the first and second passages, and
a pass/fail signaling device coupled to the cap leakage detector.

48. The tester of claim 47, wherein the cap leakage detector includes a first differential pressure transducer having two inputs, a first transducer supply conduit communicating air from the first passage to one input of the differential pressure transducer, and a second transducer supply conduit communicating air from the second passage to another input of the first differential pressure transducer.

49. The tester of claim 48, further comprising a reservoir pressure detector including a second differential pressure transducer having two inputs, a third transducer supply conduit communicating air from the reservoir to one input of the second differential pressure transducer, and a fourth transducer supply conduit communicating air from the first passage to another input of the second differential pressure transducer.

50. The tester of claim 49, wherein the fourth transducer supply conduit is connected to the first transducer supply conduit at a junction with the first passage.

51. The tester of claim 47, further comprising a reservoir pressure detector coupled to the reservoir and wherein each of the cap leakage detector and the reservoir pressure detector includes a differential pressure transducer.

52. The tester of claim 47, wherein the pass/fail signaling device includes a pass light, a fail light, and circuit means coupled to the pass and fail lights for providing a cap-failing signal to illuminate the fail light when air pressure at said one input of the first differential pressure transducer is greater than the air pressure at said another input of the first differential pressure transducer and for providing a cap-passing signal to illuminate the pass light when air pressure at said one input of the first differential pressure transducer is lesser than the air pressure at said another input of the first differential pressure transducer.

53. The tester of claim 47, wherein the reservoir includes a reservoir chamber and test actuator means for selectively conducting pressurized air from the reservoir chamber to the first and second supply conduits.

54. The tester of claim 47, wherein the reservoir includes a reservoir chamber and a reservoir flow control device communicating pressurized air from the reservoir chamber to the first and second supply conduits.

55. The tester of claim 54, wherein the reservoir flow control device includes a test actuator switch including a normally closed flow control valve, a switch intake conduit interconnecting the reservoir chamber and the flow control valve, a flow junction connected to the first and second supply conduits, and a switch discharge conduit interconnecting the flow control valve and the flow junction.

56. The tester of claim 55, wherein the normally closed flow control valve is movable between a closed position blocking flow of pressurized air from the switch intake conduit to the switch discharge conduit and an opened position permitting flow of pressurized air from the switch intake conduit to the switch discharge conduit and the test actuator switch further includes operator means for selectively moving the flow control valve from the closed position to the opened position to cause pressurized air in the reservoir chamber to be supplied to the master orifice through the first supply conduit and to the base chamber through the second supply conduit.

57. The tester of claim 55, further comprising a housing formed to include an interior region and a partition member mounted in the housing to divide the interior region into a first cavity defining the reservoir chamber and a second cavity containing the master orifice, the first and second supply conduits, and the test actuator switch.

58. The tester of claim 54, further comprising a housing containing the reservoir chamber, the master orifice, the first and second supply conduits, and the reservoir flow control device.

59. The tester of claim 58, wherein the reservoir flow control device includes a passageway interconnecting the reservoir chamber and the first and second supply conduits, a valve positioned in the passageway for movement between passageway-opening and passageway-closing positions, and a valve operator mounted on the housing and connected to the valve.

60. The tester of claim 54, further comprising a pump for charging the reservoir chamber and reservoir pressure detector connected to the reservoir chamber and to the first passage for sensing the level of pressure in the reservoir chamber.

61. The tester of claim 60, further comprising ready-to-test indicator means connected to the reservoir chamber and to the reservoir pressure detector for providing a ready-to-test signal to a user once the air pressure in the reservoir chamber reaches a predetermined minimum pressure.

62. A fuel cap leakage tester comprising:

a reservoir containing a supply of pressurized air, a base including a base chamber for receiving a fuel cap to be tested, a master orifice having a first specified flow rate at a specified test pressure and communicating with the atmosphere, a first supply conduit conducting pressurized air from the reservoir to the master orifice through a first control orifice having a second specified flow rate at the specified test pressure, the first supply conduit including a first passage interconnecting the first control orifice and the master orifice, a second supply conduit conducting pressurized air from the reservoir to the base chamber formed in the base through a second control orifice having the second specified flow rate equivalent to the first specified flow rate at the specified test pressure, the second supply conduit including a second passage interconnecting the second control orifice and the base chamber, a housing containing the reservoir, the master orifice, and the first and second supply conduits, an electronics module coupled to the housing, and a cap leakage detector positioned in the electronics module and coupled to the first and second passages.

63. The tester of claim 62, further comprising a pressurized air supply hose interconnecting the second supply conduit in the housing and the base chamber in the base.

64. The tester of claim 62, wherein the cap leakage detector includes a differential pressure transducer having a first input coupled to the first passage to communicate with air in the first passage and a second input coupled to the second passage to communicate with air in the second passage.

65. The tester of claim 64, wherein the cap leakage detector further includes a signaling device positioned in the electronics module and coupled to the differential pressure transducer to provide a cap-failing signal when the air pressure at the first input is greater than the air pressure at the second input and a cap-passing signal when the air pressure at the first input is lesser than the air pressure at the second input.

* * * * *